United States Patent
Nagao et al.

(10) Patent No.: US 11,604,983 B2
(45) Date of Patent: Mar. 14, 2023

(54) NEURAL NETWORK SYSTEM, MACHINE LEARNING METHOD, AND PROGRAM

(71) Applicant: National University Corporation YOKOHAMA National University, Yokohama (JP)

(72) Inventors: Tomoharu Nagao, Yokohama (JP); Miku Yanagimoto, Yokohama (JP)

(73) Assignee: NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 496 days.

(21) Appl. No.: 16/634,894

(22) PCT Filed: Jul. 31, 2018

(86) PCT No.: PCT/JP2018/028633
§ 371 (c)(1),
(2) Date: Jan. 29, 2020

(87) PCT Pub. No.: WO2019/031305
PCT Pub. Date: Feb. 14, 2019

(65) Prior Publication Data
US 2020/0210828 A1 Jul. 2, 2020

(30) Foreign Application Priority Data
Aug. 8, 2017 (JP) .............................. JP2017-153613

(51) Int. Cl.
*G06N 3/08* (2006.01)
*G06T 7/10* (2017.01)
(Continued)

(52) U.S. Cl.
CPC ................. *G06N 3/08* (2013.01); *G06T 7/10* (2017.01); *G06N 3/0454* (2013.01); *G06N 3/082* (2013.01);
(Continued)

(58) Field of Classification Search
CPC ........ G06N 3/0454; G06N 3/08; G06N 3/082; G06N 3/084; G06N 3/086; G06T 7/00; G06T 7/10
See application file for complete search history.

(56) References Cited

U.S. PATENT DOCUMENTS

2013/0138436 A1  5/2013  Yu et al.
2016/0139977 A1*  5/2016  Ashani ..................... G06N 3/08
                                                            714/26
2016/0224892 A1*  8/2016  Sawada .................... G06N 3/08

FOREIGN PATENT DOCUMENTS

JP    H05232986    9/1993
JP    2016-143094  8/2016

OTHER PUBLICATIONS

Japanese Notice of Allowance (w/ English translation) for Japanese Application No. 2019535124, dated Mar. 1, 2022, 4 pages.
(Continued)

*Primary Examiner* — Jaime M Holliday
(74) *Attorney, Agent, or Firm* — Dority & Manning, P.A.

(57) ABSTRACT

A neural network system includes a primary input layer configured to acquire data in both a learning mode and an operation mode, an auxiliary input layer configured to acquire data solely in the learning mode, a first partial network configured to carry out learning using both an output of the primary input layer and an output of the auxiliary input layer and to subsequently carry out learning solely using the output of the primary input layer so as to produce a same calculation result as a calculation result produced using both the output of the primary input layer
(Continued)

and the output of the auxiliary input layer, and a second partial network configured to carry out calculations in the learning mode and the operation mode upon receiving an output of the first partial network.

10 Claims, 14 Drawing Sheets

(51) Int. Cl.
  *G06N 3/04* (2006.01)
  *G06T 7/00* (2017.01)
  *G06N 3/082* (2023.01)
  *G06N 3/084* (2023.01)
  *G06N 3/086* (2023.01)

(52) U.S. Cl.
  CPC .............. *G06N 3/084* (2013.01); *G06N 3/086* (2013.01); *G06T 7/00* (2013.01)

(56) References Cited

OTHER PUBLICATIONS

Rumelhart et al., "Learning representations by back-propagating errors," *Nature,* vol. 323, Oct. 9, 1986, pp. 533-536.
International Search Report with Translation for PCT/JP2018/028633 dated Oct. 9, 2018, 2 pages.

* cited by examiner

NEURAL NETWORK SYSTEM, MACHINE LEARNING METHOD, AND PROGRAM

TECHNICAL FIELD

The present invention relates to a neural network system, a machine learning method, and a program.

The present application claims the benefit of priority on Japanese Patent Application No. 2017-153613 filed on Aug. 8, 2017, the subject matter of which is hereby incorporated herein by reference.

BACKGROUND ART

It is known that a neural network having input layers, intermediate layers, and output layers may process operation data with a relatively high accuracy by repeating learning processes using learning data according to an error back-propagation method (see Non-Patent Document 1).

CITATION LIST

Non-Patent Literature Document

Non-Patent Document 1: David E. Rumelhart, and two others, "Learning representations by back-propagation errors", Nature 323 (6088), pp. 533-536, 1986

SUMMARY OF INVENTION

Technical Problem

It is preferable that operation data be processed with a further high accuracy when an operation mode may solely provide part of the data which can be obtained by learning processes using a neural network having input layers, intermediate layers, and output layers.

The present invention aims to provide a neural network system, a machine learning method, and a program which can process operation data with a high accuracy even when an operation mode may solely provide part of the data which can be obtained by learning processes using a neural network having input layers, intermediate layers, and output layers.

Solution to Problem

According to a first aspect of the invention, a neural network system includes a primary input layer configured to acquire data in both a learning mode and an operation mode; an auxiliary input layer configured to acquire data solely in the learning mode among the learning mode and the operation mode; a first partial network configured to carry out learning using both an output of the primary input layer and an output of the auxiliary input layer and to subsequently carry out learning solely using the output of the primary input layer among the primary input layer and the auxiliary input layer so as to produce a same calculation result as a calculation result produced using both the output of the primary input layer and the output of the auxiliary input layer; and a second partial network configured to carry out calculations in the learning mode and the operation mode upon receiving an output of the first partial network.

The neural network system may further include a switcher configured to multiply the output of the auxiliary input layer to the first partial network by non-permeability representing coefficient used to adjust an influence on learning.

The switcher may gradually decrease the influence on learning with respect to the output of the auxiliary input layer to the first partial network in the learning mode.

The switcher may multiply the non-permeability to gradually decrease an output value of the auxiliary input layer to the first partial network.

The switcher may multiply a plurality of signals output from the auxiliary input layer by the non-permeability to gradually reduce the number of signals to be input to the first partial network in the learning mode.

After the first partial network carries out learning solely using the output of the primary input layer among the primary input layer and the auxiliary input layer so as to produce the same calculation result as the calculation result produced using both the output of the primary input layer and the output of the auxiliary input layer, the first partial network and the second partial network may carry out learning such that the second partial network calculates a correct answer to learning data when the first partial network solely receives the output of the primary input layer among the primary input layer and the auxiliary input layer.

According to a second aspect of the invention, a machine learning method, for a neural network system comprising a primary input layer configured to acquire data in both a learning mode and an operation mode, an auxiliary input layer configured to acquire data solely in the learning mode among the learning mode and the operation mode, a first partial network, and a second partial network configured to receive an output of the first partial network, is configured to implement: pretraining with the first partial network to carry out learning using both an output of the primary input layer and an output of an auxiliary input layer; and percolative learning, subsequent to the pretraining, with the first partial network to carry out learning solely using the output of the primary input layer among the primary input layer and the auxiliary input layer so as to produce a same calculation result as a calculation result produced using both the output of the primary input layer and the output of the auxiliary input layer.

In a third aspect of the invention, a program causes a computer, for a neural network system comprising a primary input layer configured to acquire data in both a learning mode and an operation mode, an auxiliary input layer configured to acquire data solely in the learning mode among the learning mode and the operation mode, a first partial network, and a second partial network configured to receive an output of the first partial network, is configured to implement pretraining with the first partial network to carry out learning using both an output of the primary input layer and an output of an auxiliary input layer, and percolative learning, subsequent to the pretraining, with the first partial network to carry out learning solely using the output of the primary input layer among the primary input layer and the auxiliary input layer so as to produce a same calculation result as a calculation result produced using both the output of the primary input layer and the output of the auxiliary input layer.

Advantageous Effects of Invention

According to the present invention, it is possible to process operation data with high accuracy even when an operation mode may solely provide part of the data which can be obtained by learning processes using a neural network having input layers, intermediate layers, and output layers.

DESCRIPTION OF EMBODIMENTS

Hereinafter, the present invention will be described by way of embodiments, wherein the following embodiments may not limit the invention as defined in claims. In addition, all combinations of features described in embodiments should not be restrictively interpreted as the essence of the solving means of the invention.

First Embodiment

Figure 1:
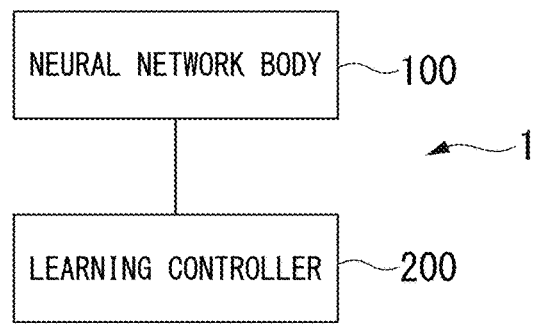
FIG. 1 is a block diagram showing the functional configuration of a neural network system according to the first embodiment.

FIG. 1 is a block diagram showing the functional configuration of a neural network system according to the first embodiment. As shown in FIG. 1, a neural network system 1 includes a neural network body 100 and a learning controller 200.

The neural network body 100 implements the machine learning according to the supervised learning to carry out calculations in an operation mode based on the learning results. Hereinafter, the machine learning will be simply referred to as learning.

Types of data which can be obtained by the neural network body 100 in an operation mode may be limited to part of types of data which can be obtained by learning. As an example of limiting types of data obtained in an operation mode to part of types of data obtained by learning, it is possible to mention an instance in which part of devices available in learning can be solely used in an operation mode.

To solve a challenge how to determine a psychological state by capturing people's facial expressions using a camera, for example, it is possible to measure brain conditions using a fMRI (Functional Magnetic Resonance Imaging) or an EEG (Electroencephalogram) sensor along with the camera. In this case, a fMRI or an EEG sensor may be used to measure brain conditions in a learning mode, and therefore measurement results of brain conditions will be input to the neural network body 100 along with camera images.

In an operation mode, camera images may be solely input to the neural network body 100 without using a fMRI or an EEG sensor.

In time-series forecasting, it is possible to mention an instance in which future data and past data are input to input layers of neural network body 100 in a learning mode as an example of limiting types of data obtained in an operation mode to part of types of data obtained by learning.

By setting a reference time in the past in a learning mode, it is possible to input learning data, which may include past data in the past of the reference time and future data in the future of the reference time, into input layers of the neural network body 100. In an operation mode, the present time (i.e. the time at which the neural network body 100 starts to carry out calculations) may be assumed as the reference time. In this case, it is not possible to input future data into the neural network body 100.

To meet a challenge of single-data-format classification, it is possible to include correct data in input data to the input layers of the neural network body 100 in a learning mode. To meet a challenge of classification using classes as classified objects, for example, it is possible to input correct data representative of correct classification to the input layers of the neural network body 100 along with data representative of classified objects.

In an operation mode in which correct answers are normally unknown, it is not possible to input correct data to the neural network body 100.

To meet a challenge of segmentation to separate images between object images and background images, it is possible to input segment data (i.e. results of segmentation) to the input layers of the neural network body 100 along with images of processed objects.

In an operation mode in which correct answers are normally unknown, it is not possible to input correct data to the neural network body 100.

Hereinafter, the type of data used in both a learning mode and an operation mode will be referred to as primary data while the type of data solely used in a learning mode within a learning mode and an operation mode will be referred to as auxiliary data.

To cope with a limitation in which the type of data obtained in an operation mode is limited to part of the type of data obtained in a learning mode, the neural network system 1 includes a mechanism to adjust influence of auxiliary data on learning, and therefore after learning using both the primary data and the auxiliary data, it proceed with learning using the primary data while reducing the influence of auxiliary data on learning. The neural network system 1 is configured to adjust the influence of auxiliary data by multiplying the auxiliary data by the non-permeability, which will be discussed later.

Figure 2:
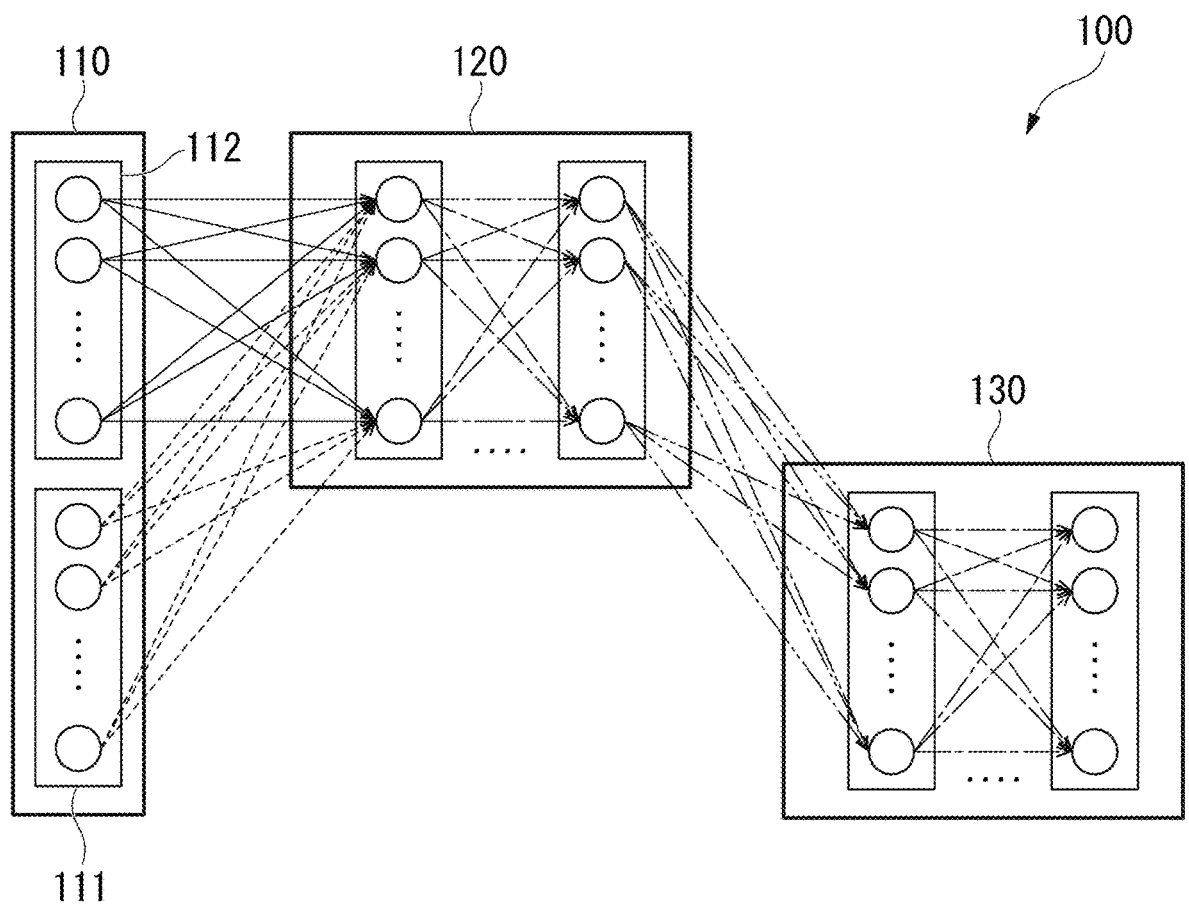
FIG. 2 is a schematic diagram showing a configuration example of a neural network body according to the first embodiment.

FIG. 2 is a schematic diagram showing a configuration example of the neural network body 100. As shown in FIG. 2, the neural network body 100 includes an input layer 110 further including a primary input layer 111 and an auxiliary input layer 112, a first partial network 120, and a second partial network 130.

Using the configurations shown in FIGS. 1 and 2, the neural network system 1 implements learning upon inputting primary data and auxiliary data. Specifically, the primary input layer 111 inputs the primary data while the auxiliary input layer 112 inputs the auxiliary data. The learning controller 200 is configured to adjust the influence of auxiliary data on learning. In addition, the first partial network 120 and the second partial network 130 are configured to implement learning by integrating the primary data and the auxiliary data.

Upon solely inputting the primary data among the primary data and the auxiliary data, the neural network system 1 implements two-step learning to achieve learning to output the same result as the result produced by inputting both the primary data and the auxiliary data.

In first-step learning, the neural network system 1 implements learning to produce correct answers represented by learning data using both the primary data and the auxiliary data.

In second-step learning, the neural network system 1 implements learning to produce the same calculation result as the pretraining by reducing the influence of auxiliary data on learning. Specifically, the neural network system 1 is configured to store the output of the first partial network 120 in the first-step learning. Subsequently, the neural network system 1 implements learning to minimize an error found between the stored output and the output of the first partial network 120 by reducing the non-permeability (i.e. coefficient used to adjust the influence of auxiliary data) from one to zero.

The neural network system 1 is configured to adjust internodes weights (or connection weights) of the neural network body 100 by learning.

Hereinafter, the learning (i.e. the first-step learning) of the neural network system 1 to produce correct answers represented by learning data using both the primary data and the auxiliary data will be referred to as pretraining.

The learning (i.e. the second-step learning) of the neural network system 1 to produce the same calculation result as the pretraining by reducing the influence of auxiliary data will be referred to as percolative learning.

To implement the aforementioned learning, the neural network body 100 includes various parts having the following functions.

Similar to the input layer of a multilayer perceptron, the input layer 110 receives data input thereto from the exterior of the neural network system 1. The primary input layer 111 is configured to input primary data in both the learning mode and the operation mode. The auxiliary input layer 112 is configured to input auxiliary data solely in the learning mode among the learning mode and the operation mode.

Upon receiving data from the input layer 110, the first partial network 120 carries out calculations in a learning mode and an operation mode. As described above, the first partial network 120 implements pretraining using both the primary data from the primary input layer 111 and the auxiliary data from the auxiliary input layer 112. After the pretraining, the first partial network 120 implements percolative learning using the primary data from the primary input layer 111 by reducing the influence of the auxiliary data from the auxiliary input layer 112.

Upon receiving calculation results of the first partial network 120, the second partial network 130 carries out calculations in a learning mode and an operation mode.

Both the first partial network 120 and the second partial network 130 can be configured using elements of conventional neural networks, thus adjusting internode connection weights by learning.

The entirety of the neural network body 100 has the same configuration as the conventional neural network except for an aspect of adjusting the influence of auxiliary data on learning in which the auxiliary data is applied to the first partial network 120 from the auxiliary input layer 112 as discussed later. The last layer of the second partial network 130 may have a function of an output layer in the entirety of the neural network body 100. Herein, the last layer is a layer at the backmost position (or a downstream side) in a flow of data being sequentially propagating. In addition, a layer at a topmost position (or a upstream side) in a flow of data being sequentially propagating will be referred to as a topmost layer.

The number of layers and the number of nodes included in the first partial network 120 are not necessarily limited to specific numbers. In addition, the number of layers and the number of nodes included in the second partial network 130 are not necessarily limited to specific numbers.

The learning controller 200 controls learning processes in the neural network body 100. In particular, the learning controller 200 may switch over the pretraining and the percolative learning.

Figure 3:
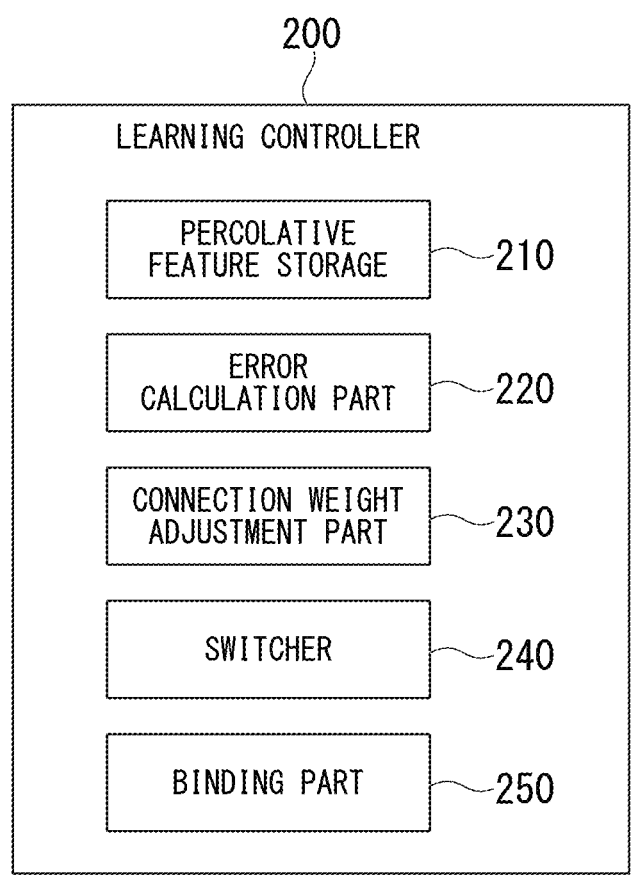
FIG. 3 is a block diagram showing a functional configuration example of a learning controller according to the first embodiment.

FIG. 3 is a block diagram showing a functional configuration example of the learning controller 200. As shown in FIG. 3, the learning controller 200 includes a percolative feature storage 210, an error calculation part 220, a connection weight adjustment part 230, a switcher 240, and a binding part 250.

The learning controller 200 controls learning processes in the neural network body 100. For example, the learning controller 200 may be configured of a computer such as a personal computer (PC).

The neural network body 100 may be configured of a computer. In this connection, it is possible to configure the neural network body 100 according other methods than using computers such that the neural network body 100 may be realized using dedicated hardware.

The percolative feature storage 210 stores data values, which are output from the last layer of the first partial network 120 by pretraining after sufficiently making pretraining, with respect to each input data (i.e. a combination of primary data and auxiliary data). The percolative feature storage 210 is configured of a storage device included in a computer used to configure the learning controller 200.

Hereinafter, the date stored on the percolative feature storage 210 will be referred to as percolative features or percolative data.

The error calculation part 220 calculates a difference (or an error) between the calculation result, which is produced by the entirety or part of the neural network body 100, and the data which is set as a correct answer. In pretraining, the error calculation part 220 calculates an error between the output of the last layer of the second partial network 130 and a correct answer represented by the learning data. In percolative learning, the error calculation part 220 calculates an error between the output of the last layer of the first partial network 120 and the percolative feature.

The connection weight adjustment part 230 adjusts internode connection weights of the neural network body 100 based on errors calculated by the error calculation part 220. The adjustment of connection weights may correspond to the learning of the neural network body 100.

As a method of adjusting internode connection weights in the neural network body 100 (i.e. a learning method of the neural network body 100), it is possible to use the error backpropagation method. In pretraining, it is possible to carry out learning by applying the error backpropagation method to the entirety of the neural network body 100. In percolative learning, it is possible to carry out learning by applying the error backpropagation method to the first partial network 120.

In percolative learning, the connection weight adjustment part 230 adjusts internode connection weights in the first partial network 120 such that the last layer of the first partial network 120 can output the percolative feature with a reduced influence of auxiliary data on learning. Herein, the internode connection weights of the first partial network 120 refer to the connection weights of subsequent nodes to their preceding nodes in the first partial network 120. Similarly, the connection weights between the nodes of the input layer 110 and the nodes of the first partial network 120 will be also treated as the internode connection weights of the first partial network 120.

Since the last layer of the first partial network 120 outputs the percolative feature with a reduced influence of auxiliary data on learning, it is expected that the entirety of the neural network body 100 may output the same calculation result as the pretraining using both the primary data and the auxiliary data. In particular, it is expected that the neural network body 100 may output the same calculation result as the calculation result produced using both the primary data and the auxiliary data even when the percolative learning may reduce the influence of auxiliary data to zero.

Accordingly, it is expected to produce the same calculation result as the calculation result produced using both the primary data and the auxiliary data by way of the pretraining and the percolative learning when the neural network body 100 receives only the primary data among the primary data and the auxiliary data.

The switcher 240 is configured to adjust an influence of auxiliary data on learning in which the auxiliary data is applied to the first partial network 120 from the auxiliary input layer 112. Specifically, the switcher 240 multiplies each of the output values, which are output to the nodes of the topmost layer of the first partial network 120 from the nodes of the auxiliary input layer 112, by the same coefficient. The coefficient is the coefficient having a variable value used to adjust an influence of auxiliary data on learning. Hereinafter, the coefficient will be referred to as non-permeability.

In pretraining, the switcher 240 sets the non-permeability to "1" and thereby multiplies each of the output values, which are output to the nodes of the topmost layer of the first partial network 120 from the nodes of the auxiliary input layer 112, by the non-permeability of "1". The non-permeability of "1" indicates that the influence of auxiliary data is identical to the influence of primary data on learning in the neural network body 100.

In percolative learning, the switcher 240 sets the non-permeability to a smaller value than one, and therefore the switcher 240 multiplies each of the output values, which are output to the nodes of the topmost layer of the first partial network 120 from the nodes of the auxiliary input layer 112, by the non-permeability smaller than one. The non-permeability smaller than one indicates that the influence of auxiliary data is reduced to be smaller than the influence of primary data on learning in the neural network body 100.

In percolative learning, the switcher 240 may finally reduce the non-permeability to zero. This makes it possible for the neural network body 100 to carry out learning using only the primary data among the primary data and the auxiliary data.

After the pretraining is switched to the percolative learning, the switcher 240 may gradually reduce the non-permeability. Herein, the term "gradually" indicates the existence of at least one intermediate state.

Specifically, the switcher 240 may reduce the non-permeability from one to zero after setting the non-permeability to an intermediate value between one and zero. Accordingly, it is possible to prevent the disadvantage in which the percolative learning will not make full use of the pretraining results due to a rapid change of the search space in the optimization of the neural network body 100.

Alternatively, the switcher 240 may immediately change the non-permeability from one to zero at the time of switching the pretraining with the percolative learning. That is, the switcher 240 may change the non-permeability between one and zero.

Accordingly, the neural network body 100 may promptly carry out learning using only the primary data among the primary data and the auxiliary data. In this sense, it is expected to reduce the learning time of the neural network body 100.

Alternatively, the switch 240 may be able to change the non-permeability with respect to each of the output values which are output to the node of the topmost layer of the first partial network 120 from the nodes of the auxiliary input layer 112. When the pretraining is switched to the percolative learning, the switcher 240 may multiply multiple output signals of the auxiliary input layer 112 by the non-permeability so as to gradually reduce the number of input signals to the first partial network 120.

Specifically, in the pretraining, the switcher 240 sets the non-permeability to one with respect to all the output values which are output to the nodes of the topmost layer of the first partial network 120 from the nodes of the auxiliary input layer 112. In the percolative learning, the switcher 240 solely changes part of non-permeability from one to zero among non-permeabilities for the output values which are output to the nodes of the topmost layer of the first partial network 120 from the nodes of the auxiliary input layer 112. The switcher 240 change the non-permeability multiple times to thereby change all the non-permeabilities to zero.

Accordingly, in the pretraining, the switcher 240 may gradually thin out the signals which are output to the nodes of the topmost layer of the first partial network 120 from the nodes of the auxiliary input layer 112.

Due to the process of the switcher 240 to gradually thin out signals, similar to the process of gradually reducing the non-permeability, it is possible to prevent the disadvantage in which the percolative learning will not make full use of the pretraining results due to a rapid change of the search space in the optimization of the neural network body 100.

The method to implement the process of the switcher 240 to change the non-permeability from one to zero is not necessarily limited to a specific method. For example, the switcher 240 may include switching elements, which are turned on or off to thereby execute the process of changing the non-permeability from one to zero.

The binding part 250 binds the primary data and the auxiliary data after multiplied by the non-permeability. Herein, the data binding indicates an operation to aggregate multiple data into single data. In the image recognition discussed later, the primary data and the auxiliary data are each configured of image data, and therefore the binding part 250 binds two image data together. For example, it is possible to bind two image data together by directly binding data strings serving as image data.

Due to the data binding of the binding part 250, it is possible for the neural network system 1 to handle a combination of primary data and auxiliary data as single data.

In this connection, the binding part 250 is not necessarily disposed at the position in the circuitry of FIG. 4 discussed later. For example, it is possible to bind activities which can be obtained during the process of directly inputting the primary data and the auxiliary data after multiplied by the non-permeability into the first partial network 120 in parallel without the intervention of the binding part 250.

It is possible to configure the error calculation part 220, the connection weight adjustment part 230, the switcher 240, and the binding part 250 using a computer of the learning controller 200 with a CPU (Central Processing Unit) configured to read and execute programs on a storage device of the computer.

According to the configuration of the third embodiment discussed later, the learning controller 200 further includes a combiner 260. It is possible to configure the combiner 260 using a computer of the learning controller 260 with a CPU (Central Processing Unit) configured to read and execute programs on a storage device of the computer.

Figure 4:
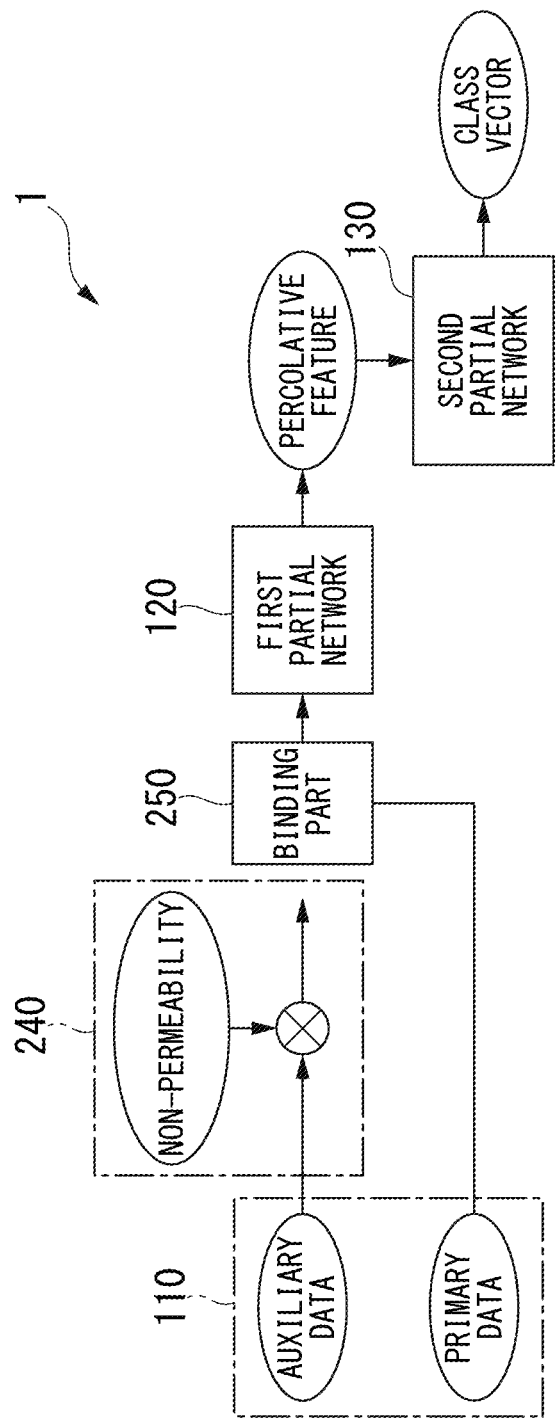
FIG. 4 is a block diagram showing a functional configuration example of a neural network system according to the first embodiment.

FIG. 4 is a block diagram showing a functional configuration example of the neural network system 1.

In learning, the input layer 110 acquires primary data and auxiliary data so as to output the acquired primary data and the acquired auxiliary data. The switcher 240 multiplies the auxiliary data, which is output from the input layer 110, by the non-permeability.

The binding part 250 binds the primary data and the auxiliary data after multiplied by the non-permeability.

The bound data is input to the first partial network 120. In pretraining, the first partial network 120 implements learning using the bound data to calculate the percolative feature. As described above, the percolative feature is an output value, which is output from the last layer of the first partial network 120 after sufficiently making pretraining.

Upon receiving the percolative feature, the second partial network 130 implements learning such that the last layer of the second partial network 130 can produce a class vector. Herein, the class vector corresponds to an example of a correct answer which is produced from the learning data.

In pretraining, as described above, it is possible for the entirety of the neural network body 100 to carry out learning according to the error backpropagation method based on the input data and the class vector.

Figure 5:
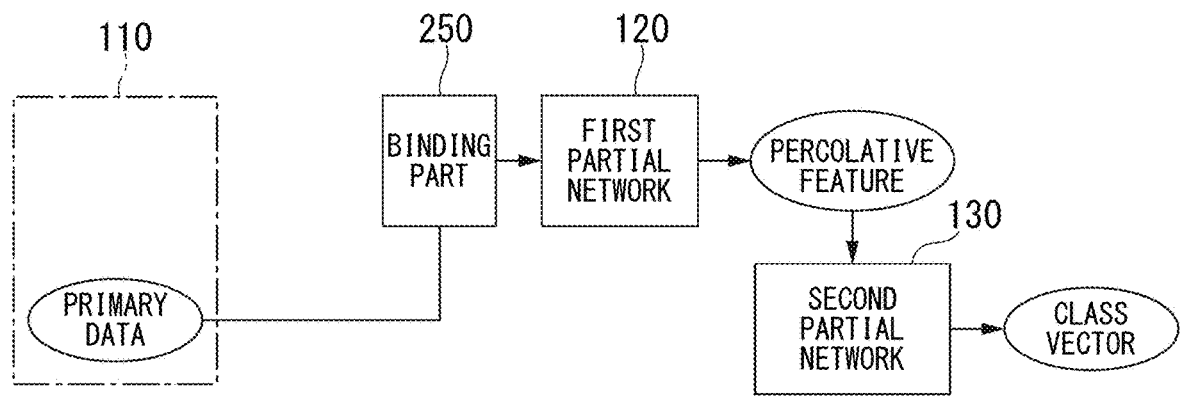
FIG. 5 is a block diagram showing a functional configuration example of a neural network system when a non-permeability is set to zero in the first embodiment.

FIG. 5 is a block diagram showing a functional configuration example of the neural network system when the non-permeability is zero.

Through comparison between FIG. 4 and FIG. 5, FIG. 5 does not show the auxiliary data and the switcher 240. The condition of FIG. 5 shows that the neural network system 1 implements learning by ignoring the auxiliary data due to zero non-permeability.

Due to zero non-permeability via percolative learning, the binding part 250 outputs the primary data to the first partial network 120. In an example of the image recognition discussed later, the binding part 250 binds the primary data with the image data having zero pixel-values instead of the auxiliary data, thus outputting the bound data to the first partial network 120.

Due to zero non-permeability via percolative learning, the first partial network 120 carries out learning based on primary data and percolative features. Accordingly, upon solely receiving the primary data among the primary data and the auxiliary data, the first partial network 120 may carry out learning to produce the same calculation result (i.e. the percolative feature) as the calculation result produced upon receiving both the primary data and the auxiliary data.

Even when the first partial network 120 solely receives the primary data among the primary data and the auxiliary data, it is expected that the second partial network 130, which is configured to carry out calculations upon receiving the calculation result of the first partial network 120, may produce the same calculation result as the calculation result which is produced when the first partial network 120 receives both the primary data and the auxiliary data. Accordingly, it is expected that the neural network body 100, which solely receives the primary data among the primary data and the auxiliary data, may produce the same calculation result as the calculation result produced upon receiving both the primary data and the auxiliary data. Based on the primary data in an operation mode, it is expected that the neural network system 1 may produce its calculation result with an adequate accuracy as if the neural network system 1 might have produced the calculation result upon receiving both the primary data and the auxiliary data.

Next, an example of learning experiments conducted by the neural network system 1 will be described.

In experiments, a computer is configured to work under an environment activating the operation of the neural network system 1 and to thereby carry out learning with the neural network system 1 for a challenge to estimate written characters from image data representing hand-written numbers ranging from 0 to 9. The experiments are made using image data retrieved from the MNIST which is an image database of hand-written numbers.

In experiments, a process to transpose (or shuffle) pixels in image data retrieved from the MNIST has been carried out with respect to a certain ratio of pixels among all pixels, thus producing primary data. In this connection, a different selection of pixels to be shuffled may be applied to each data. In addition, image data retrieved from the MNIST are used as auxiliary data.

Figure 6:
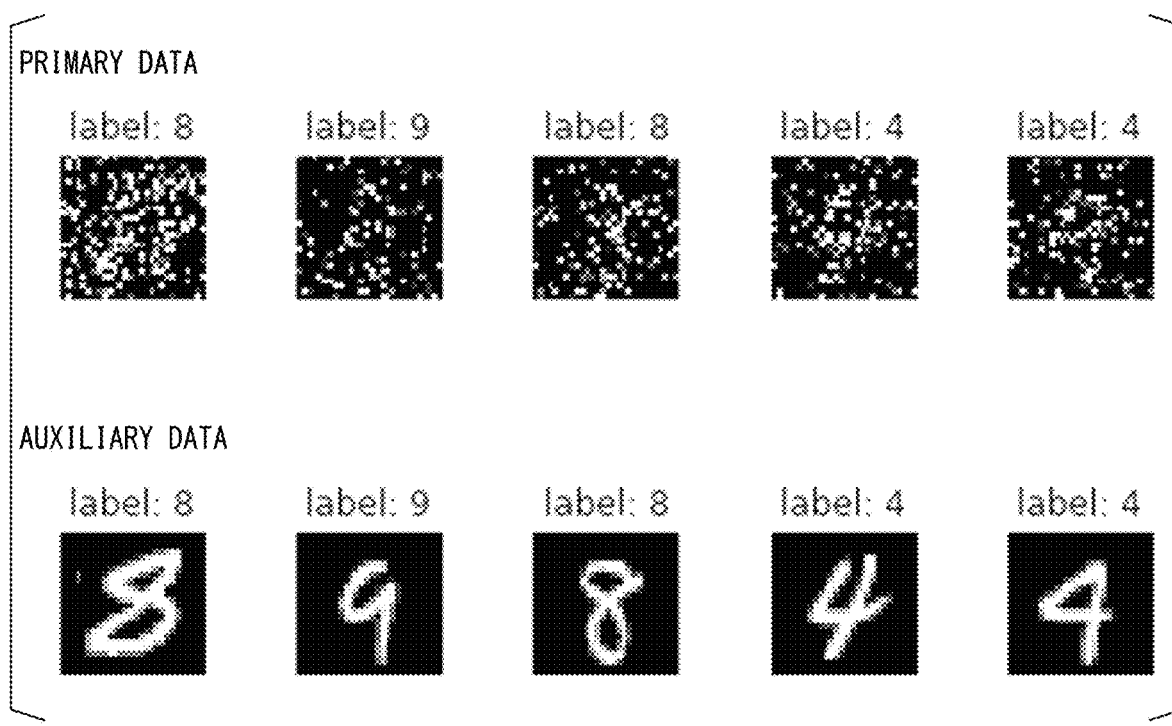
FIG. 6 shows examples of primary data and auxiliary data in experiments according to the first embodiment.

FIG. 6 shows examples of primary data and auxiliary data used in experiments. FIG. 6 shows examples of primary data and auxiliary data in connection with hand-written numbers 8, 9, 8, 4, 4 which are aligned from the left to the right in the drawing sheet. As described above, it is possible to produce primary data by carrying out a process to shuffle pixel values of image data represented by auxiliary data with respect to a certain ratio of pixels among all pixels.

Figure 7:
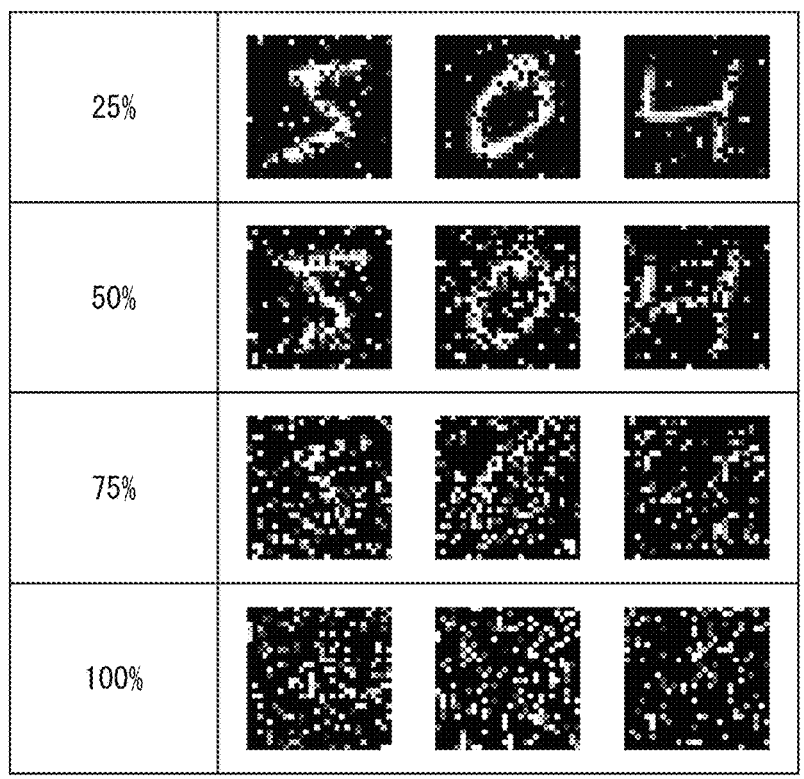
FIG. 7 shows examples of images in terms of degrees of shuffling pixel values in experiments according to the first embodiment.

FIG. 7 shows examples of images in terms of degrees of shuffled pixel values. FIG. 7 shows examples of images, which are produced by shuffling pixels within 25%, 50%, 75%, and 100% of all pixels with respect to hand-written numbers 5, 0, 4 which are aligned from the left to the right in the drawing sheet.

In experiments, learning is carried out with respect to an example of shuffling 50% of pixels within all pixels and an example of shuffling 75% of pixels within all pixels.

Figure 8:
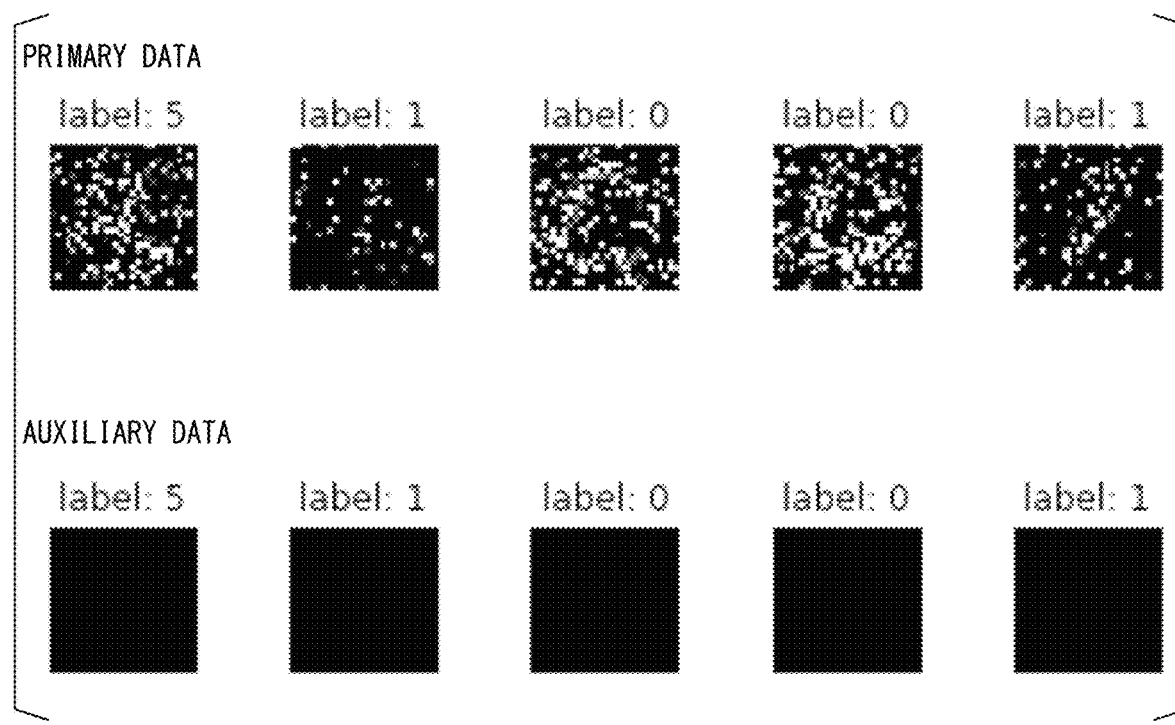
FIG. 8 shows examples of primary data and auxiliary data in an operation mode in experiments according to the first embodiment.

FIG. 8 shows examples of primary data and auxiliary data in an operation (or experiment) mode. Since no auxiliary data are obtained in an operation mode, image data all having zero pixel-values are used as auxiliary data. Accordingly, it is possible to reduce an influence of auxiliary data on calculations made by the neural network body 100 using auxiliary data to zero.

FIG. 8 shows examples of primary data and auxiliary data with respect to hand-written numbers 5, 1, 0, 0, 1 which are aligned from the left to the right in the drawing sheet.

The aforementioned experiments have been conducted in an attempt to confirm the operation of the neural network system 1 which is activated in the same condition as the operation mode. Herein, predetermined data having the already-known correct answers are used as experimental data, however, correct answers are not provided to the neural network system 1. Therefore, the neural network system 1 carries out calculations in the state that correct answers are unknown similar to the operation mode. Correct answers are used to calculate an accuracy (or an accuracy rate) of calculation results produced by the neural network system 1.

Figure 9:
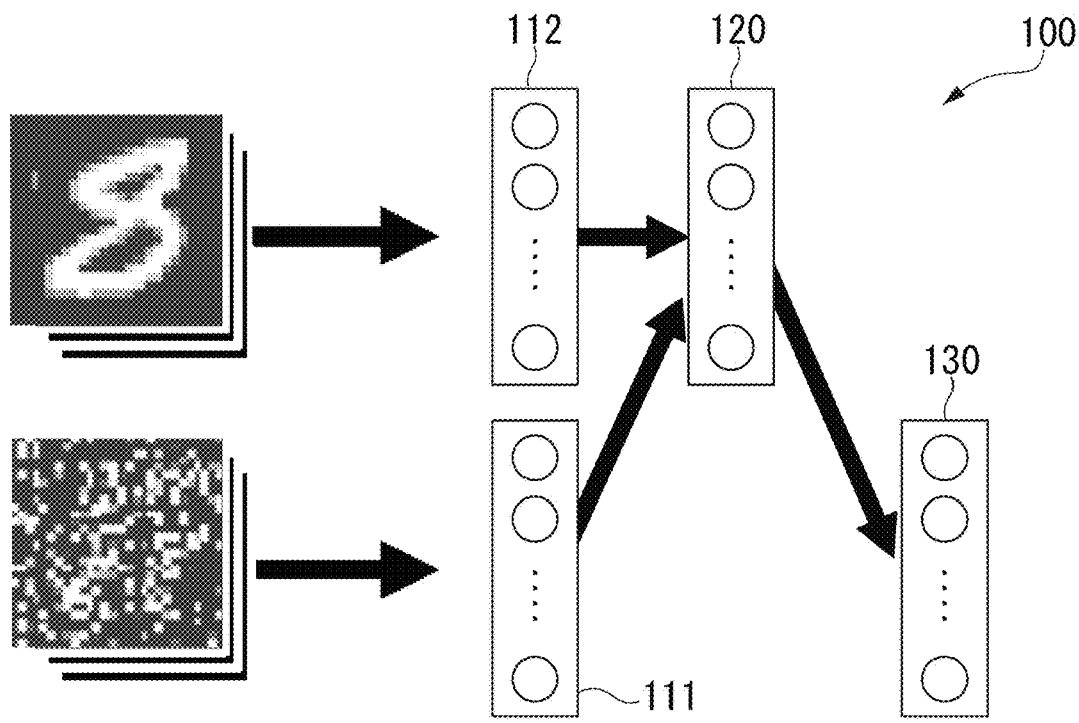
FIG. 9 shows examples of input data in pretraining according to the first embodiment.

FIG. 9 shows examples of input data for pretraining. In pretraining, the primary data and the auxiliary data shown in FIG. 6 are input to the primary input layer 111 and the auxiliary input layer 112, and therefore the neural network body 100 carries out learning using the primary data and the auxiliary data.

Figure 10:
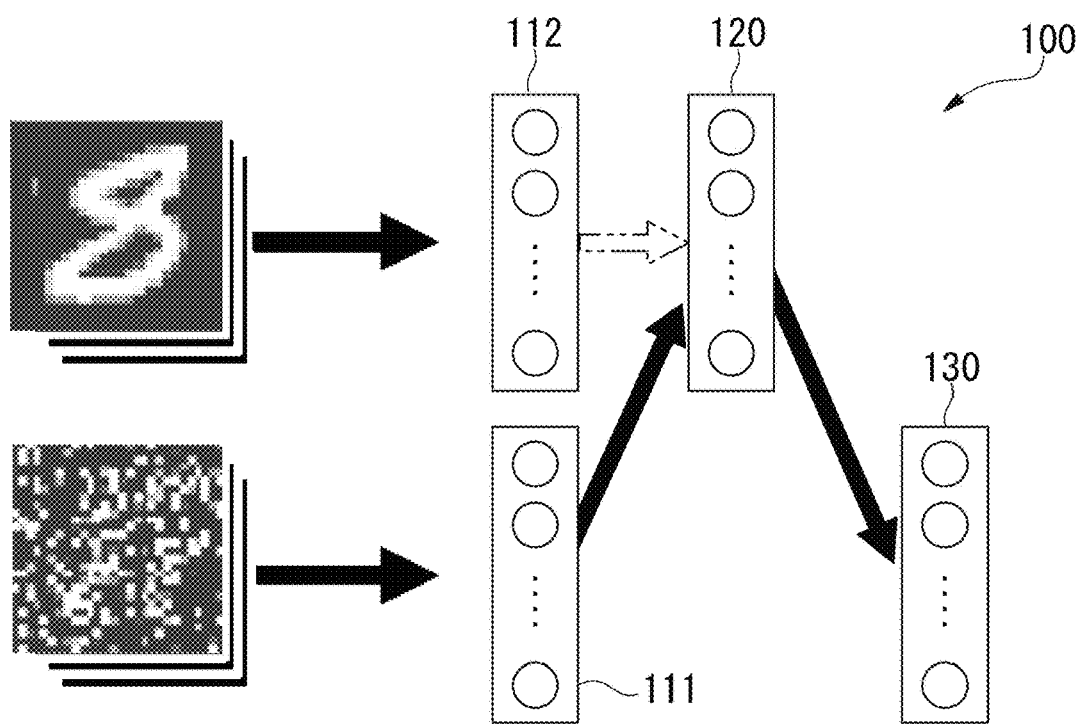
FIG. 10 shows examples of input data when non-permeability is zero according to the first embodiment.

FIG. 10 shows examples of input data when the non-permeability is zero.

In the percolative learning when the non-permeability is zero, similar to the pretraining, the primary data are input to the first partial network 120 from the primary input layer 111. Due to zero non-permeability, the auxiliary data from the auxiliary input layer 112 are not input to the first partial network 120. In this case, all the pixels of the auxiliary data are converted into zero pixel-values due to zero non-permeability. Accordingly, similar to the input mode as described above with reference to FIG. 8, instead of the auxiliary data, the image data with pixels all having zero pixel-values are input to the first partial network 120. Therefore, the neural network body 100 carries out learning solely based on the primary data among the primary data and the auxiliary data.

Figure 11:
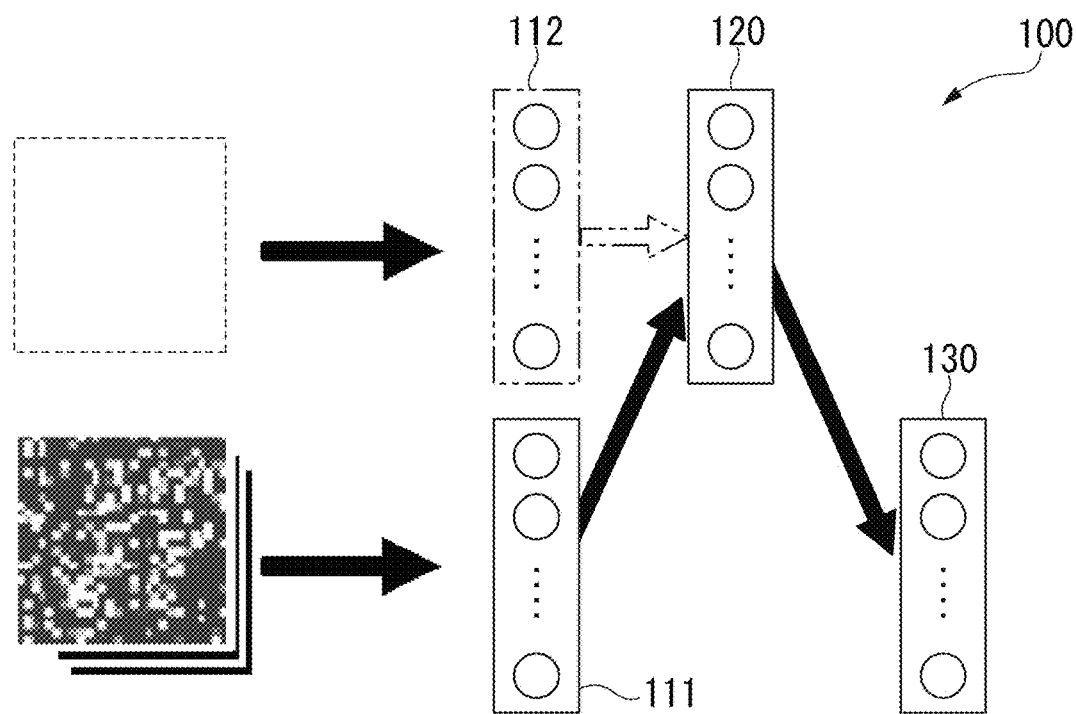
FIG. 11 shows examples of input data in an operation mode according to the first embodiment.

FIG. 11 shows examples of input data in an operation mode.

In an operation mode, the auxiliary data are not input to the auxiliary input layer 112. In this case, as described above with reference to FIG. 8, instead of the auxiliary data, the image data with pixels all having zero pixel-values are input to the first partial network 120. Accordingly, the neural network body 100 carries out calculations solely based on the primary data among the primary data and the auxiliary data.

Figure 12:
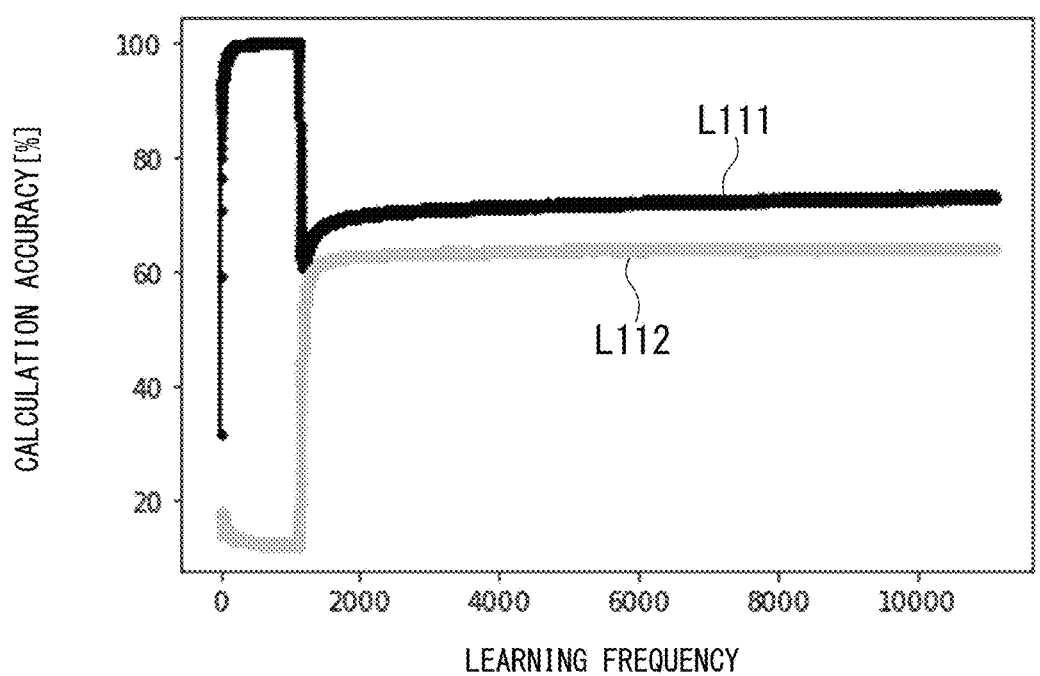
FIG. 12 is a graph showing an example of learning results produced by shuffling 75% of pixels within all pixels in experiments according to the first embodiment.

FIG. 12 is a graph showing an example of learning results produced by shuffling 75% of pixels within all pixels. In the graph of FIG. 12, the horizontal axis represents learning frequency (or an epoch number). The vertical axis represents an accuracy of calculation results produced by the neural network body 100. Specifically, the vertical axis represents an accuracy rate of determination by the neural network body 100.

Line L111 indicates the accuracy of calculation results via learning. Specifically, line L111 indicates a ratio as to how many calculation results via learning may match correct answers. Line L112 indicates an accuracy of calculation results by experiments. In experiments, experimental data are input to carry out calculations every time the neural network body 100 carries out learning, and therefore the accuracy of calculation results is produced at each time of making learning.

Hereinafter, an accuracy of calculation results via learning will be referred to as a training accuracy. An accuracy of calculation results via experiments will be referred to as an experimental accuracy. As described above, the neural network system 1 carries out calculations in experiments under the same condition as the operation mode. For this reason, the experimental accuracy represents an accuracy of calculation results produced by the neural network system 1 and the neural network body 100 in the operation mode.

In experiments, the pretraining should be repeatedly carried up to one-thousands times as learning frequency, and then, the percolative learning will be carried out by gradually reducing the non-permeability.

In the example of FIG. 12, the experimental accuracy (see line L112) is temporarily increased just after staring pretraining and then decreased, but the experimental accuracy is increased after starting the percolative learning and then remains at approximately the constant value. In addition, the training accuracy (see line L111) is temporarily increased up to approximately 100%; thereafter, the training accuracy is temporarily reduced at pretraining and then recovered to some extent, and remains at approximately the constant value. In the example of FIG. 12, the final training accuracy is 73.04% while the final training accuracy is 64.04%.

Figure 13:
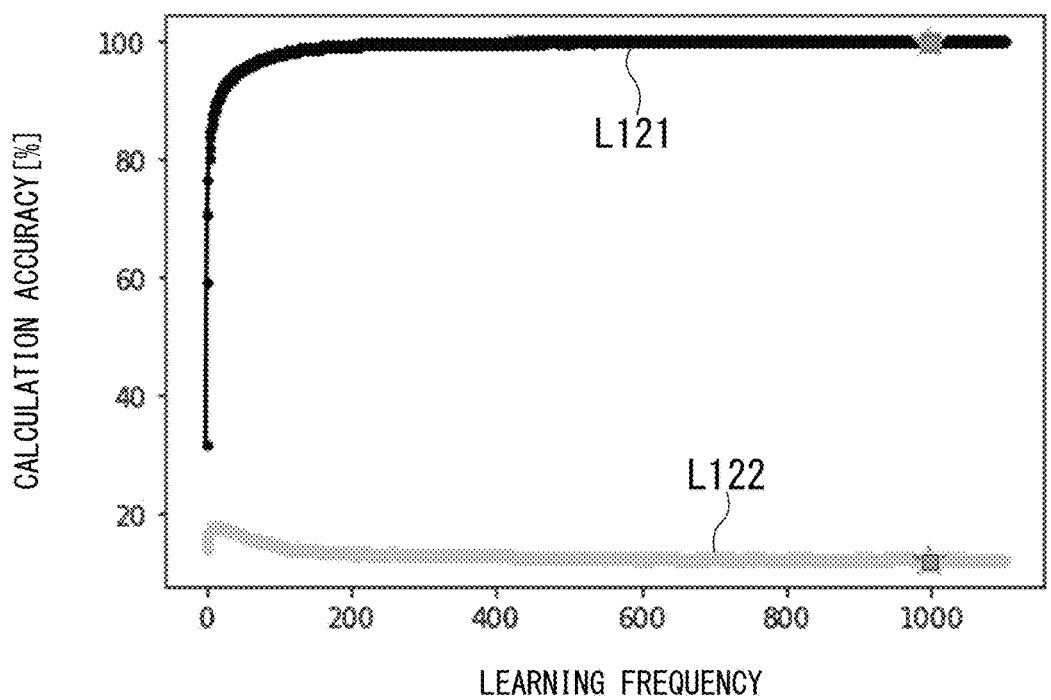
FIG. 13 is a graph showing an example of learning results produced by learning according to a generally-known multilayer perceptron and a generally-known error backpropagation method using primary data and auxiliary data when 75% of pixels out of all pixels are shuffled.

FIG. 13 is a graph showing an example of learning results produced by learning according to the generally-known multilayer perceptron and the generally-known error back-propagation method using primary data and auxiliary data when 75% of pixels out of all pixels are shuffled. In the graph of FIG. 13, the horizontal axis represents learning frequency (or an epoch number). The vertical axis represents an accuracy of calculation results produced by the neural network body 100. Specifically, the vertical axis represents an accuracy rate of determination by the neural network body 100.

Line L121 shows a training accuracy. Line L122 shows an experimental accuracy. In the example of FIG. 13, primary data are solely used in experiments.

FIG. 13 shows learning results realizing a high training accuracy (see line L121) but a lower experimental accuracy than the accuracy of learning results shown in FIG. 12.

In the example of FIG. 13, the final training accuracy is 99.98% while the final experimental accuracy is 12.11%.

Through comparison between the example of FIG. 12 and the example of FIG. 13, the neural network system 1 achieves a higher experimental accuracy due to percolative learning in an operation mode (or in experiments) disusing auxiliary data than the experimental accuracy of learning produced according to the generally-known multiplayer perceptron and the generally-known error backpropagation method alone. In this connection, the neural network system 1 can process operation data with high accuracy.

Figure 14:
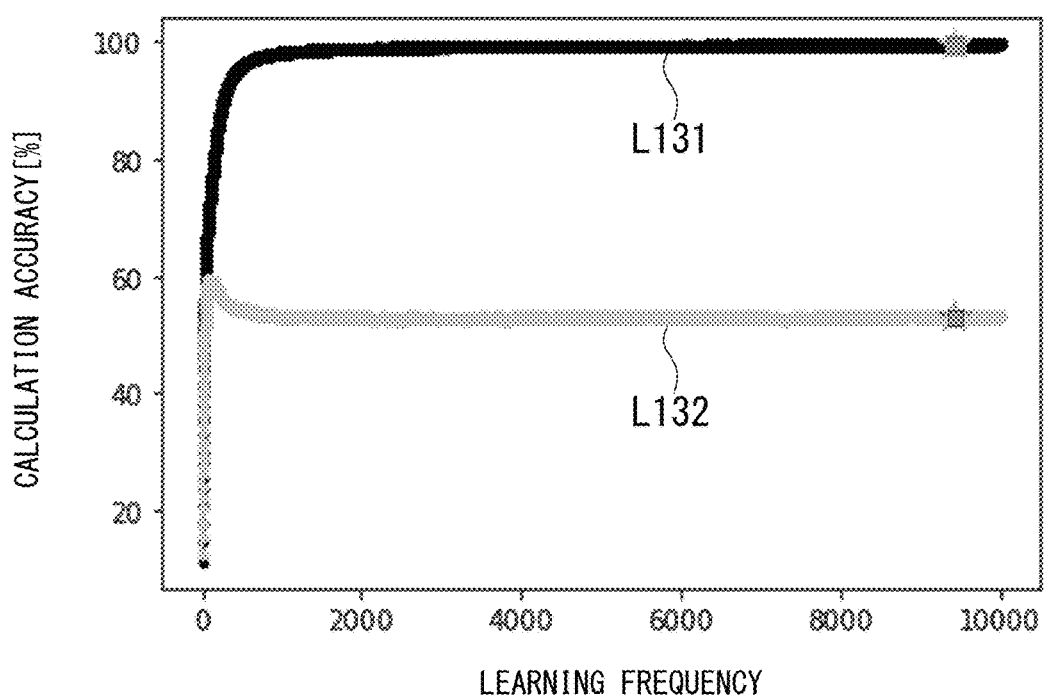
FIG. 14 is a graph showing an example of learning results produced by learning according to the generally-known multilayer perceptron and the generally-known error backpropagation method solely using primary data when 75% of pixels out of all pixels are shuffled.

FIG. 14 is a graph showing an example of learning results produced by learning according to the generally-known multilayer perceptron and the generally-known error back-propagation method solely using primary data when 75% of pixels out of all pixels are shuffled. In the graph of FIG. 14, the horizontal line represents learning frequency (or an epoch number). The vertical axis represents an accuracy of calculation results produced by the neural network body 100. Specifically, the vertical axis represents the accuracy rate of determination by the neural network body 100.

Line L131 indicates a training accuracy. Line L132 indicates an experimental accuracy.

In the example of FIG. 14, the primary data are solely used in both a training mode and an experimental mode.

In the example of FIG. 14, the final training accuracy is 99.67%, while the final experimental accuracy is 53.17%.

Through comparison between the example of FIG. 12 and the example of FIG. 14, the neural network system 1 can achieve a higher experimental accuracy via percolative learning in an operation mode (or an experimental mode) disusing the auxiliary data than an accuracy of learning implemented without using the auxiliary data. In this connection, the neural network system 1 is able to process operation data with high accuracy.

Figure 15:
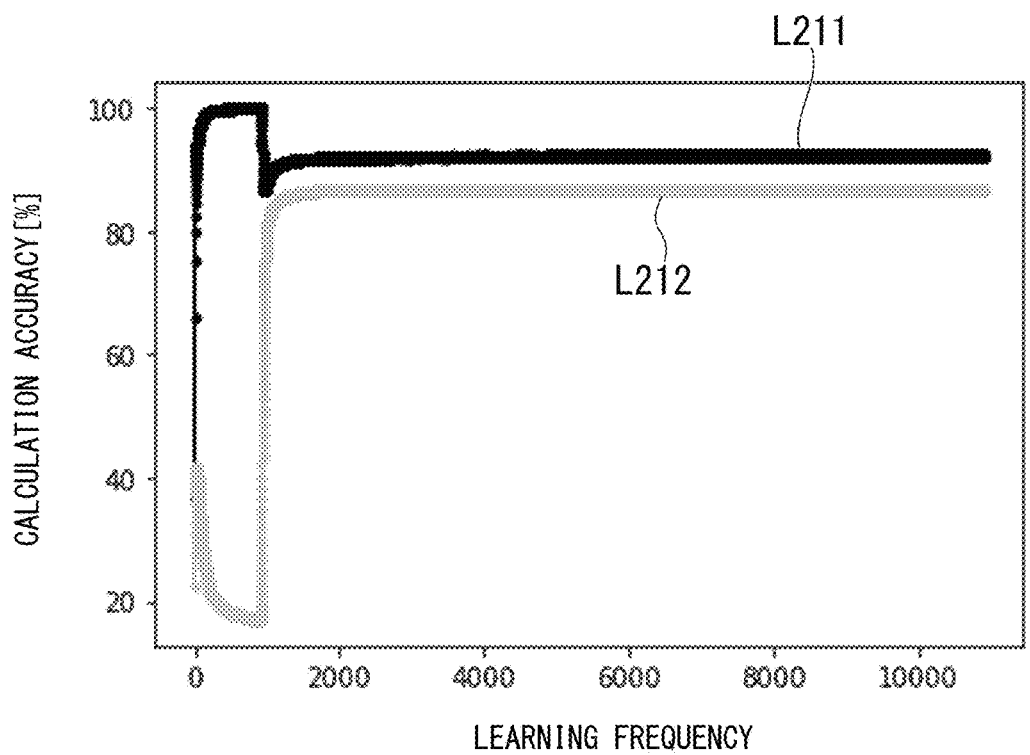
FIG. 15 is a graph showing an example of learning results when 50% of pixels out of all pixels are shuffled in experiments according to the first embodiment.

FIG. 15 is a graph showing an example of learning results when 50% of pixels out of all pixels are shuffled in experiments according to the first embodiment. In the graph of FIG. 15, the horizontal axis represents learning frequency (or an epoch number). The vertical axis represents an accuracy of calculation results produced by the neural network body 100. Specifically, the vertical axis represents an accuracy rate of determination by the neural network body 100.

Line L211 indicates a training accuracy. Line L212 indicates an experimental accuracy.

The experimental accuracy (see line L212) is temporarily increased just after starting pretraining and then decreased, but the experimental accuracy is increased after starting percolative learning and the remains at approximately the constant value. The training accuracy (see line L211) is increased up to approximately 100% but temporarily decreased in pretraining and the recovered to some extent, thereafter, the training accuracy remains at approximately the constant value. In the example of FIG. 15, the final training accuracy is 92.43%, while the final experimental accuracy is 86.75%.

Figure 16:
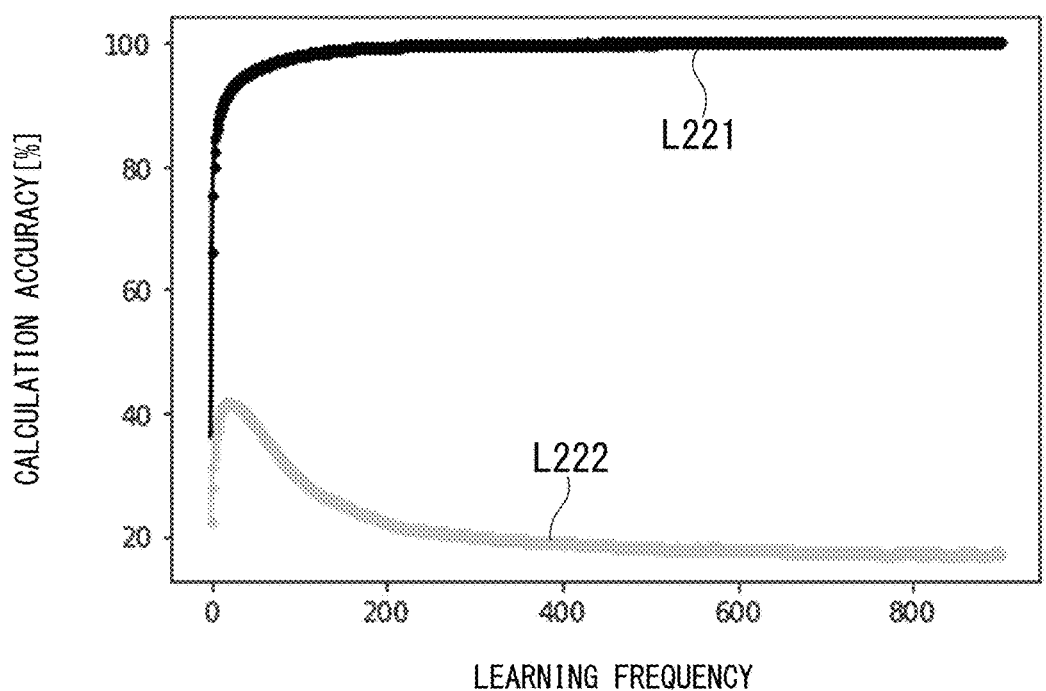
FIG. 16 is a graph showing an example of learning results produced by learning according to the generally-known multilayer perceptron and the generally-known error backpropagation method using primary data and auxiliary data when 75% of pixels out of all pixels are shuffled.

FIG. 16 is a graph showing an example of learning results produced by learning according to the generally-known multilayer perceptron and the generally-known error back-propagation method using primary data and auxiliary data when 75% of pixels out of all pixels are shuffled. In the graph of FIG. 16, the horizontal axis represents learning frequency (or an epoch number). The vertical axis represents an accuracy of learning results produced by the neural network body 100. Specifically, the vertical axis represents an accuracy rate of determination by the neural network body 100.

Line L221 indicates a training accuracy. Line L222 indicates an experimental accuracy.

In the example of FIG. 16, the primary data are solely used in an experimental mode.

According to the learning results shown in FIG. 16, it is possible to obtain high training accuracy (see line L221), but the experimental accuracy (see line L222) is lower than an accuracy of learning results shown in FIG. 15.

In the example of FIG. 16, the final training accuracy is 99.97%, while the final experimental accuracy is 16.97%.

Through comparison between the example of FIG. 16 and the example of FIG. 15, the neural network system 1 can achieve a higher experimental accuracy via percolative learning in an operation mode (or an experimental mode) disusing the auxiliary data than an accuracy of learning according to the generally-known multilayer perceptron and the generally-known error backpropagation method. In this connection, the neural network system 1 is able to process operation data with high accuracy.

Figure 17:
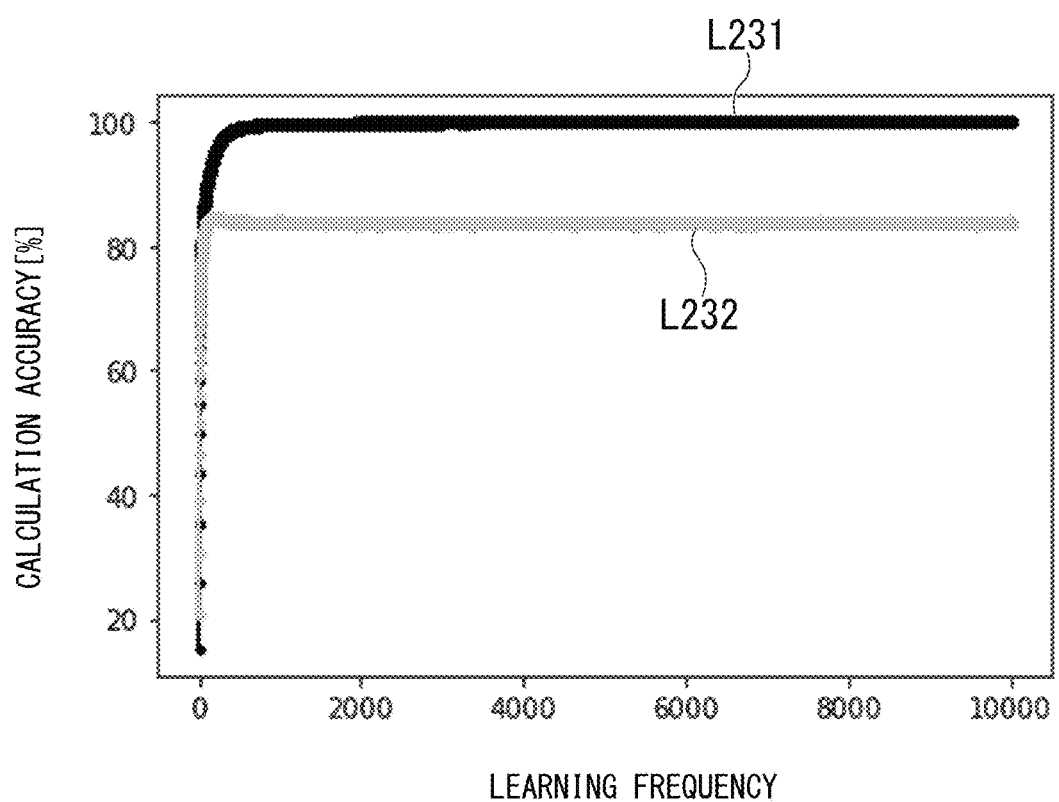
FIG. 17 is a graph showing an example of learning results produced by learning according to the generally-known multilayer perceptron and the generally-known error backpropagation method solely using primary data when 50% of pixels out of all pixels are shuffled.

FIG. 17 is a graph showing an example of learning results produced by learning according to the generally-known multilayer perceptron and the generally-known error back-propagation method solely using primary data when 50% of pixels out of all pixels are shuffled. In the graph of FIG. 17, the horizontal axis represents learning frequency (or an epoch number). The vertical axis represents an accuracy of calculation results produced by the neural network body 100. Specifically, the vertical axis represents an accuracy rate of determination by the neural network body 100.

Line L231 indicates a training accuracy. Line L232 indicates an experimental accuracy.

In the example of FIG. 17, the primary data are solely used in an experimental mode.

In the example of FIG. 17, the final training accuracy is 99.97%, while the final experimental accuracy is 83.90%.

Through comparison between the example of FIG. 15 and the example of FIG. 17, the neural network system 1 can achieve a higher experimental accuracy via percolative learning in an operation mode (or an experimental mode) disusing the auxiliary data than an accuracy of learning implemented without using the auxiliary data. In this connection, the neural network system 1 is able to process operation data with high accuracy.

In this connection, it is possible for the neural network system 1 to carry out fine-adjustment learning by further continuing percolative learning depending on the learning status of pretraining and percolative learning. In the fine-adjustment learning, the entirety of the neural network system 1 carries out learning according to the error back-propagation method while maintaining zero non-permeability. The fine-adjustment learning may rewrite percolative features. Hereinafter, the fine-adjustment learning subsequent to the percolative learning will be referred to as fine tuning.

As a criterion of determination as to whether or not to carry out fine tuning, it is possible to use an operation to determine whether or not the training accuracy is reduced via percolative learning. It is possible to reveal a factor in which percolative features may not be sufficiently fit to a challenge with respect to a reduction of the training accuracy in percolative learning. Accordingly, it is expected to increase the experimental accuracy via fine tuning to further fit percolative features to a challenge.

However, an increase of the experimental accuracy may not necessarily indicate a good accuracy in an operation mode (or an experimental mode) due to overlearning. To make a good determination considering the above deficiency, it is possible to determine the validity of fine tuning based on a curve shape representative of the training accuracy in percolative learning. Alternatively, it is possible to set the validity according to verification accuracy upon setting verification data in advance.

Figure 18:
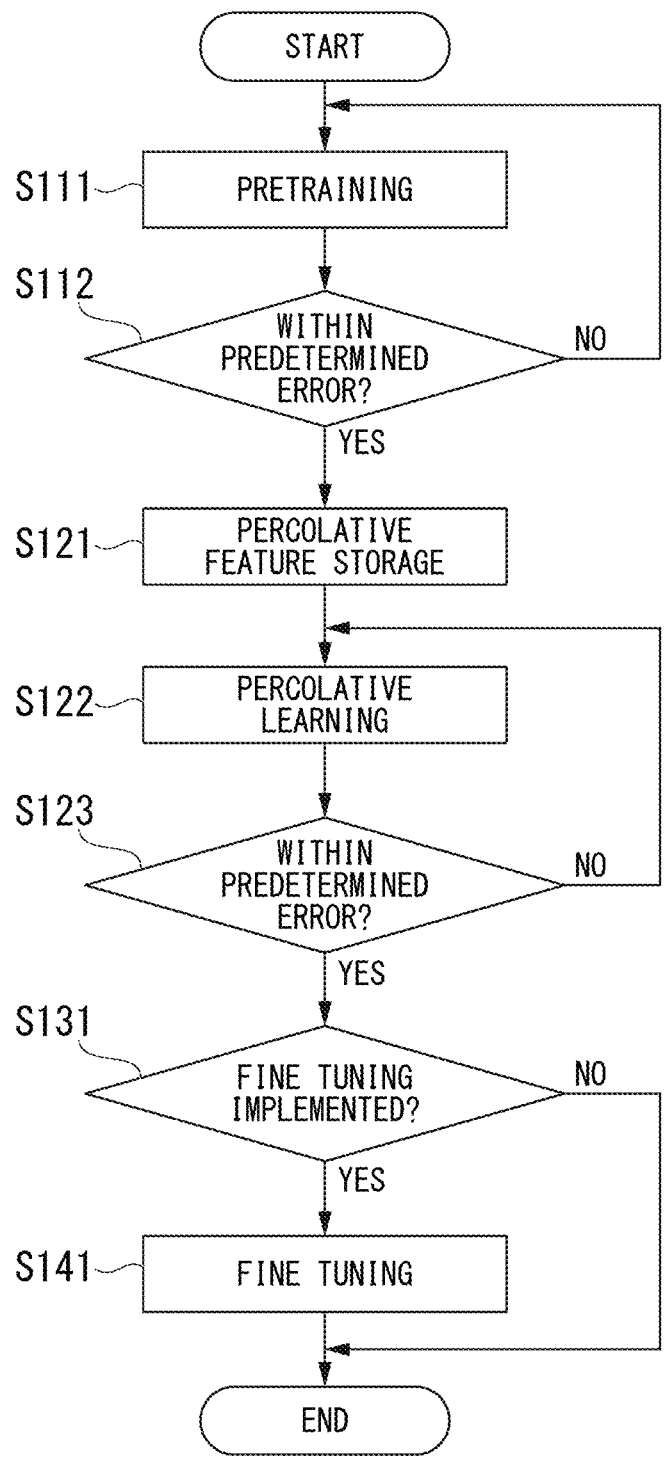
FIG. 18 is a flowchart showing an operation example of the neural network system 1 in learning according to the first embodiment.

Next, the operation of the neural network system 1 will be explained with reference to FIG. 18. FIG. 18 is a flowchart showing an operation example of the neural network system 1 in its learning mode.

In the example of FIG. 18, the neural network system 1 carries out pretraining (step S111).

Specifically, the neural network system 1 carries out learning using correct answers indicated by learning data according to the error backpropagation method.

After the neural network system 1 completes pretraining using all learning data, the learning controller 200 determines whether or not a difference (or an error) between the output of the last layer of the second partial network 130 and the correct answer indicated by learning data falls within a predetermined range of errors (step S112).

When the learning controller 200 determines that the difference does not fall within a predetermined range of errors (step S112: NO), the flow of processing returns to step S111.

When the learning controller 200 determines that the difference falls within a predetermined range of errors (step S112: YES), the percolative feature storage 210 stores percolative features (step S121), and therefore the neural network system 1 carries out percolative learning (step S122).

After the neural network system 1 completes percolative learning using all learning data, the learning controller 200 determines whether or not a difference (or an error) between the output of the last layer of the first partial network 120 and the percolative feature falls within a predetermined range of errors (step S123).

When the learning controller 200 falls within a predetermined range of errors (step S123: NO), the flow of processing returns to step S122.

Upon determining that the difference falls within a predetermined range of errors (step S123: YES), the learning controller 200 determines whether or not to carry out fine tuning (step S131). When the percolative learning produces the training accuracy substantially lower than a predetermined reference value, for example, the learning controller 200 determines to carry out fine tuning. Alternatively, a user may determine whether or not to carry out fine tuning with the neural network system 1 in consideration of an easiness of overlearning, and therefore the user may instruct the neural network system 1 to carry out fine tuning. In this case, the learning controller 200 determines whether or not to carry out fine tuning according to a user instruction.

When the learning controller 200 determines not to carry out fine tuning (step S131: NO), the neural network system 1 exits the process of FIG. 18.

On the other hand, when the learning controller 200 determines to carry out fine tuning (step S131: YES), the neural network system 1 carries out fine tuning (step S141). The neural network system 1 may carry out fine tuning a predetermined number of times. Alternatively, the neural network system 1 may carry out fine tuning until a difference (or an error) between the output of the last layer of the second partial network 130 and the correct answer indicated by learning data falls within a predetermined range of errors.

After step S141, the neural network system 1 exits the process of FIG. 18.

The configuration of the neural network system according to the above embodiment may not be necessarily limited to the configuration shown in FIG. 4.

Figure 19:
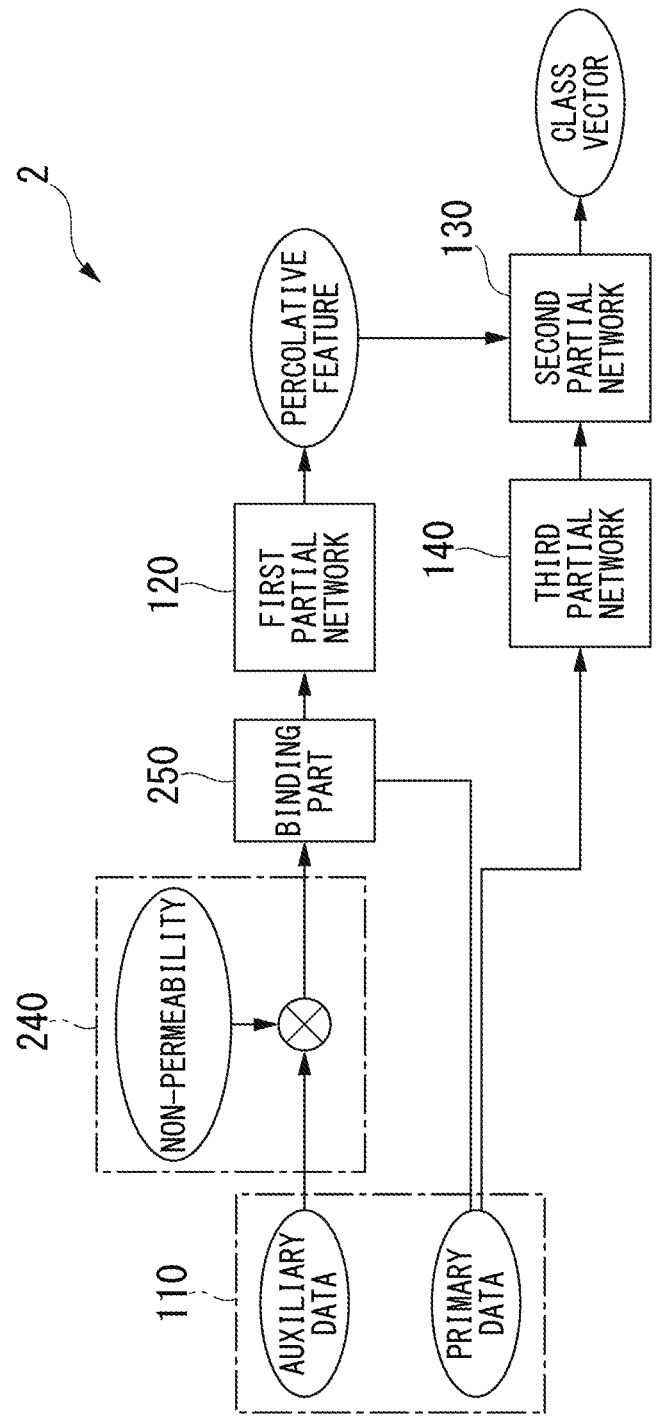
FIG. 19 is a block diagram showing a variation of the neural network system according to the first embodiment.

FIG. 19 is a block diagram showing a neural network system according to a variation of the embodiment.

FIG. 19 shows a neural network system 2 further including a third partial network 140 in addition to the configuration of the neural network system 1 shown in FIG. 4. Other constitution elements of the neural network system 2 are similar to those of the neural network system 1.

The third partial network 140 receives primary data to carry out calculations in a learning mode and an operation mode, thus outputting calculation results to the second partial network 130.

The third partial network 140 may have a similar configuration as the existing neural network. Alternatively, the third partial network 140 not involving any nodes may be configured of a branch connected from a certain node of the primary input layer 111 to its corresponding node of the second partial network 130.

Second Embodiment

Compared with the first embodiment, the second embodiment refers to an example of generalizing the configuration of the neural network body 100.

Figure 20:
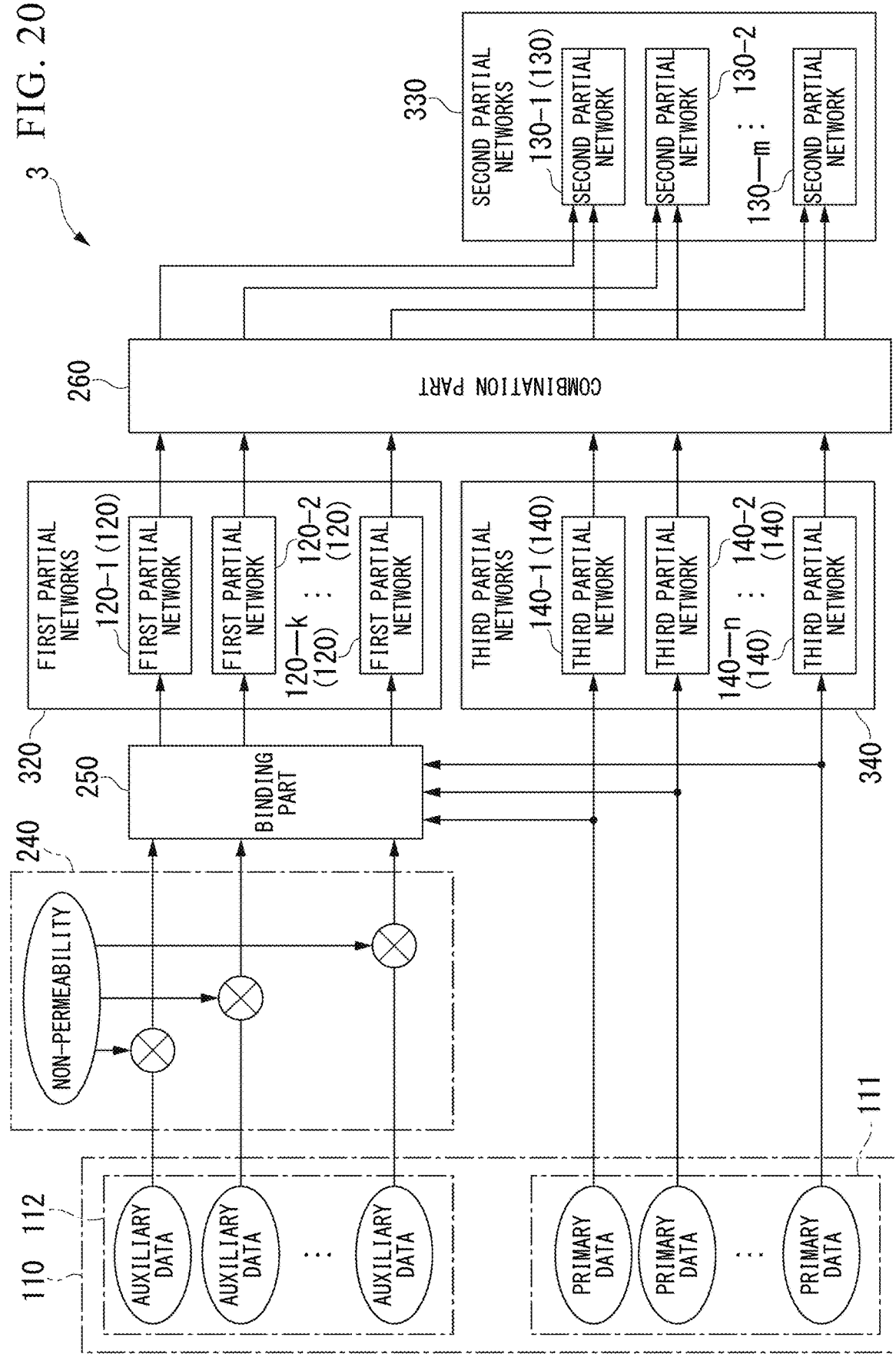
FIG. 20 is a block diagram showing a functional configuration example of a neural network system according to the second embodiment.

FIG. 20 is a block diagram showing a functional configuration example of a neural network system according to the second embodiment. According to the configuration shown in FIG. 20, a neural network system 3 includes the input layer 110, the switcher 240, the binding part 250, a combination part 260, a first partial network group 320, a second partial network group 330, and a third partial network group 340.

The input layer 110 includes the primary input layer 111 and the auxiliary input layer 112. The first partial network group 320 includes k units (where k is an integer, k≥1) of first partial networks 120. In FIG. 20, the k units of first partial networks 120 are denoted by reference signs of 120-1 through 120-$k$. The second partial network group 330 includes m units (where m is an integer, m≥1) of second partial networks 130. In FIG. 20, the m units of second partial networks 130 are denoted by reference signs of 130-1 through 130-$m$. The third partial network group 340 includes n units (where n is an integer, n≥1) of third partial networks 140. In FIG. 20, n units of third partial networks 140 are denoted by reference signs of 140-1 through 140-$n$.

The input layer 110, the first partial network group 320, the second partial network group 330, and the third partial network group 340 may be included in the neural network body 100. In addition, the switcher 240, the binding part 250, and the combination part 260 may be included in the learning controller 200.

The neural network system 2 shown in FIG. 19 differs from the neural network system 3 shown in FIG. 20 in terms of the number of first partial networks 120, the number of second partial networks 130, and the number of third partial network 140. The neural network system 2 shown in FIG. 19 includes a single partial network 120, a single second partial network 130, and a single third partial network 140. In contrast, the neural network system 3 shown in FIG. 20 may include multiple units of first partial networks 120, multiple units of second partial networks 130, and multiple units of third partial networks 140.

In the neural network system 3, the primary input layer 111 includes its nodes divided into groups while the auxiliary input layer 112 includes its nodes divided into groups. Based on the presetting, the binding part 250 outputs its bound data for each group of primary data and for each group of auxiliary data multiplied by non-permeability to the first partial network 120 determined by the presetting among the first partial network 120-1 through the first partial network 120-k.

Based on the presetting, the combination part 260 outputs the output of each first partial network 120 and the output of each third partial network 140 to the second partial network 130 determined by the presetting among the second partial network 130-1 through the second partial network 130-m.

Other elements of the neural network system 3 are similar to those of the neural network system 2.

According to the configuration of the neural network system 3, it is possible to prevent a reduction of learning accuracy due to an input of low-correlative data.

For example, it is possible to consider the case in which the neural network system 3 carries out machine learning upon inputting sensing data from an automobile. In this case, it is possible to find out a correlation between the direction of tires and the steering angle of a handle. In contrast, no correlation would be normally found between the direction of tires and a degree to depress an accel pedal. Due to an input of all auxiliary data into the first partial network, the learning accuracy would be reduced under the influence of the low-correlative auxiliary data.

For this reason, the binding part 250 can be set to selectively input the auxiliary data into the first partial networks if a correlation between primary data and auxiliary data was known in advance. In addition, the combination part 260 can be set to selectively input percolative features produced by the first partial network into the second partial networks. Accordingly, it is possible to prevent the low-correlative data from being input to each of first partial networks and each of second partial networks. In this connection, the neural network system 3 may carry out machine learning with high accuracy.

Similar options as the first embodiment can be applied to the neural network system 3 of the second embodiment.

Similar to the first embodiment, the switcher 240 may multiply each of the outputs of the auxiliary input layer 112 by the non-permeability having the same value, or it is possible to change the value of the non-permeability for each output of the auxiliary input layer 112. After the pretraining is switched to the percolative learning, the switcher 240 may multiply a plurality of signals output from the auxiliary input layer 112 by the non-permeability such that the number of signals input to the first partial networks 120 will be gradually reduced.

The third partial network may have the similar configuration as the existing neural network. Alternatively, the third partial network not having any nodes can be configured of a branch connected from a certain node of the primary input layer 111 to its corresponding node of the second partial network 130. Similar to the configuration of the neural network system 1, the neural network system 3 may have the configuration precluding the third partial network 140.

Both the neural network system 1 and the neural network system 2 according to the first embodiment may be exemplary examples of the neural network system 3.

The neural network system 3, which includes a single first partial network a single second partial network but precludes a third partial network, may have the same configuration as the neural network system 1.

In this case, the nodes of the primary input layer and the nodes of the auxiliary input node are not divided into groups. For this reason, the number of node groups of the primary input layer and the number of node groups of the auxiliary input layer are both set to one. In addition, the combination part 260 applies the outputs of all the nodes of the last layer of the first partial network 120 to all nodes of the topmost layer of the second partial network.

The neural network system 3, which includes a single first partial network, a single second partial network, and a single third partial network, may have the same configuration as the neural network system 2.

In this case, the nodes of the primary input layer and the nodes of the auxiliary input layer are not divided into groups. Accordingly, the number of node groups of the primary input layer and the number of node groups of the auxiliary input layers are both set to one. In addition, the combination part 260 applies the outputs of all the nodes of the last layer of the first partial network 120 to all nodes of the topmost layer of the second partial network.

Considering a relatively good status of the primary data due to a relatively small amount of noise in the primary data, it is possible to set a path passing through the second and third partial networks disusing auxiliary data as a main path in a learning and operation mode and to thereby correct data of the main path using the first partial network using auxiliary data.

Considering a relatively bad status of the primary data due to a relatively large amount of noise in the primary data, the configuration of the neural network system precluding the third partial network may have a chance to produce a good result.

In any one of the neural network systems 1, 2, 3, the number of layers in partial networks and the number of nodes for each layer are not necessarily limited to specific numbers. Herein, the term "partial networks" is a general term representative of the first partial network 120, the second partial network 130, and the third partial network 140.

For example, the learning controller 200 of FIG. 3 may determine the number of layers for each partial network and the number of nodes for each layer using evolutionary computation such as genetic algorithm (GA).

As described above, the primary input layer 111 is configured to acquire the primary data in both a learning mode and an operation mode. On the other hand, the auxiliary input layer 112 is configured to acquire the auxiliary data solely in a learning mode among a learning mode and an operation mode. After carrying out learning using both the primary data and the auxiliary data, the first partial network 120 further carries out learning solely using the primary data among the primary data and the auxiliary data such that the first partial network 120 can produce the same calculation results as the calculation results of learning using both the primary data and the auxiliary data. Upon receiving the output of the first partial network 120, the second partial network 130 carries out calculations in a learning and operation mode.

Accordingly, it is expected that the entirety of the neural network body 100 would produce the same calculation results as the calculation results of learning using both the primary data and the auxiliary data since the first partial network 120 carries out learning solely using the primary data among the primary data and the auxiliary data such that the first partial network 120 can produce the same calculation results as the calculation results of learning using both the primary data and the auxiliary data. The entirety of the neural network body 100 is able to carry out calculations with the same accuracy as the accuracy of learning using both the primary data and the auxiliary data since the neural network body 100 solely receives the primary data among the primary data and the auxiliary data so as to produce the same calculation results as the calculation results of learning using both the primary data and the auxiliary data. In this connection, the neural network system 1 is able to process operation data with further high accuracy even when it receives part of data obtained in a learning mode.

The switcher 240 multiplies the output (auxiliary data) of the auxiliary input layer 112 to the first partial network 120 by non-permeability. According to multiplication, the switcher 240 can adjust the influence of auxiliary data on learning.

By setting zero non-permeability, the neural network system 1 may carry out percolative learning solely using the primary data among the primary data and the auxiliary data.

In addition, the switcher 240 may gradually reduce the influence of the output (auxiliary data) of the auxiliary input layer 112 to the first partial network 120 on learning in a learning mode.

Accordingly, it is possible to prevent the disadvantage in which the percolative learning cannot make full use of the results of pretraining due to a rapid change of the search space during the optimization of the neural network body 100.

In addition, the switcher 240 may carry out multiplication using the non-permeability to gradually reduce an output value from the auxiliary input layer 112 to the first partial network 120 in a learning mode.

According to a relatively simple process to gradually reduce a non-permeability value, the neural network system 1 may prevent the disadvantage in which the percolative learning cannot make full use of the pretraining results due to a rapid change of the search space during the optimization of the neural network body 100.

Moreover, the switcher 240 may multiply a plurality of signals output from the auxiliary input layer 112 by the non-permeability to gradually reduce the number of signals input to the first partial network 120 in a learning mode.

Similar to the foregoing process to gradually reduce the non-permeability value, the neural network system 1 is able to prevent the disadvantage in which the percolative learning cannot make full use of the pretraining results due to a rapid change of the search space during the optimization of the neural network body 100.

After the first partial network 120 carries out the percolative learning solely using the primary data among the primary data and the auxiliary data to produce the same calculation results as the calculation results of learning using both the primary data and the auxiliary data, the first partial network 120 and the second partial network 130 may carry out fine tuning of learning such that the second partial network 130 can produce correct answers to learning data when the first partial network 120 solely receives the primary data among the primary data and the auxiliary data.

Accordingly, it is possible to fit percolative features to a challenge via fine tuning when percolative features obtained by percolative learning are not adequately fit to a challenge, and therefore it is possible to improve an accuracy of calculation results produced by the neural network body 100 in an operation mode.

Figure 21:
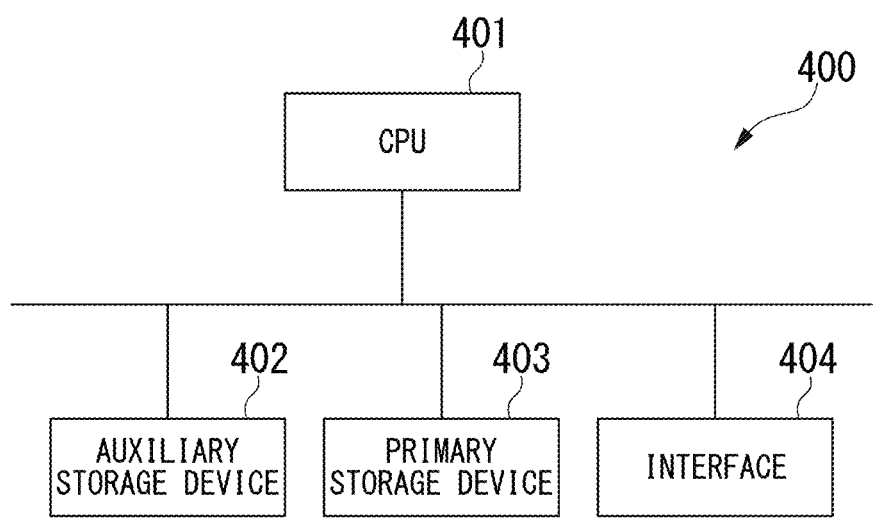
FIG. 21 is a block diagram showing a configuration example of a computer according to at least one of the embodiments.

FIG. 21 is a block diagram showing a configuration example of a computer according to at least one embodiment. According to the configuration of FIG. 21, a computer 400 includes a CPU (Central Processing Unit) 401, a main storage device 403, an auxiliary storage device 402, and an interface 404.

The neural network body 100 and the learning controller 200 are each configured of the computer 400.

When the computer 400 implements the neural network body 100, the operations of the constitutional elements of the neural network body 100 are stored on the auxiliary storage device 402 in the form of programs. The CPU 401 reads programs from the auxiliary storage device 402 to expand programs on the main storage device 403, thus executing the process of the neural network body 100 according to programs.

To implement the learning controller 200 with the computer 400, the operations of the constitutional elements of the learning controller 200 are stored on the auxiliary storage device in the form of programs. The CPU 401 reads programs from the auxiliary storage device 402 to expand programs on the main storage device 403, thus executing the process of the learning controller 200 according to programs.

To implement the entirety of the neural network system 1, 2, or 3 with a single computer 400, the operations of the constitutional elements of the neural network system 1, 2, or 3 are stored on the auxiliary storage device 402 in the form of programs. The CPU 401 reads programs from the auxiliary storage device 403 to expand programs on the main storage device 403, thus executing the process of the neural network system 1, 2, or 3 according to programs.

It is possible to store programs, which may realize functions representative of the entirety or part of calculations and controls implemented by the neural network system 1, on computer-readable storage media, wherein a computer system may load programs stored on storage media to thereby execute programs, thus achieving processes of various parts. Herein, the term "computer system" may include an OS and hardware such as peripheral devices.

In addition, the term "computer system" may include homepage providing environments (or homepage displaying environments) when using the WWW system.

Moreover, the term "computer-readable storage media" may refer to flexible disks, magneto-optical disks, ROM, portable media such as CD-ROM, and storage devices such as hard disks embedded in computer systems. The foregoing programs may achieve part of the foregoing functions, or the foregoing programs may be combined with pre-installed programs of computer systems to thereby achieve the foregoing functions.

Heretofore, the present invention has been described in detail by way of the embodiments with reference to the drawings; however, the concrete configurations thereof are not necessarily limited to the foregoing embodiments, and therefore the present invention may embrace any design changes without departing from the subject matter of the invention.

INDUSTRIAL APPLICABILITY

The foregoing embodiments of the present invention are applicable to neural network systems, machine learning methods, and programs.

REFERENCE SIGNS LIST 1 neural network system
100, 101 neural network body
110 input layer
111 primary input layer
112 auxiliary input layer
120, 120-1, 120-2, . . . , 120-1 first partial network
130, 130-1, 130-2, . . . , 130-$m$ second partial network
140, 140-1, 140-2, . . . , 140-$n$ third partial network
200 learning controller
210 percolative feature storage 220 error calculation part
230 connection weight adjustment part
240 switcher
250 binding part
260 combination part

The invention claimed is:

1. A neural network system comprising:
a primary input layer configured to acquire data in both a learning mode and an operation mode;
an auxiliary input layer configured to acquire data solely in the learning mode;
a first partial network configured to carry out learning using both an output of the primary input layer and an output of the auxiliary input layer and to subsequently carry out learning solely using the output of the primary input layer so as to produce a same calculation result as a calculation result produced using both the output of the primary input layer and the output of the auxiliary input layer;
a second partial network configured to carry out calculations in the learning mode and the operation mode upon receiving an output of the first partial network; and
a switcher configured to multiply the output of the auxiliary input layer to the first partial network by non-permeability representing a coefficient used to adjust an influence on learning.

2. The neural network system according to claim 1, wherein the switcher is configured to gradually decrease the influence on learning with respect to the output of the auxiliary input layer to the first partial network in the learning mode.

3. The neural network system according to claim 2, wherein the switcher is configured to multiply the non-permeability to gradually decrease an output value of the auxiliary input layer to the first partial network.

4. The neural network system according to claim 2, wherein the switcher is configured to multiply a plurality of signals output from the auxiliary input layer by the non-permeability to gradually reduce the number of signals to be input to the first partial network in the learning mode.

5. A neural network system comprising:
a memory configured to store instructions and a processor configured to execute the instructions to implement:
a primary input layer configured to acquire primary data in both a learning mode and an operation mode;
an auxiliary input layer configured to acquire auxiliary data solely in the learning mode;
a first partial network configured to carry out learning using both the primary data of the primary input layer and the auxiliary data of the auxiliary input layer and to subsequently carry out learning solely using the primary data of the primary input layer so as to produce a same calculation result as a calculation result produced using both the primary data of the primary input layer and the auxiliary data of the auxiliary input layer;
a second partial network configured to carry out calculations in the learning mode and the operation mode upon receiving the output of the first partial network; and
a switcher configured to multiply the auxiliary data of the auxiliary input layer to be output to the first partial network by non-permeability representing a coefficient used to adjust an influence on learning,
wherein after the first partial network carries out pretraining using both the primary data of the primary input layer and the auxiliary data of the auxiliary input layer, the first partial network performs percolative learning solely using the primary data of the primary input layer by adjusting the non-permeability, thus allowing the second partial network to produce correct answers of learning data.

6. The neural network system according to claim 5, wherein the switcher is configured to gradually decrease the influence on learning with respect to the output of the auxiliary input layer to the first partial network in the learning mode.

7. The neural network system according to claim 6, wherein the switcher is configured to multiply the non-permeability to gradually decrease an output value of the auxiliary input layer to the first partial network.

8. The neural network system according to claim 6, wherein the switcher is configured to multiply a plurality of signals output from the auxiliary input layer by the non-permeability to gradually reduce the number of signals to be input to the first partial network in the learning mode.

9. A machine learning method for a neural network system comprising a primary input layer configured to acquire primary data in both a learning mode and an operation mode, an auxiliary input layer configured to acquire auxiliary data solely in the learning mode, a first partial network configured to receive the primary data of the primary input layer and to receive the auxiliary data of the auxiliary input layer multiplied by non-permeability representing a coefficient used to adjust an influence on learning, and a second partial network configured to receive the output of the first partial network, the machine learning method implementing:
performing pretraining by the first partial network using both the primary data of the primary input layer and the auxiliary data of the auxiliary input layer; and
after the pretraining, performing percolative learning by the first partial network solely using the primary data of the primary input layer by adjusting the non-permeability so as to produce a same calculation result as a calculation result produced using both the primary data of the primary input layer and the auxiliary data of the auxiliary input layer.

10. A non-transitory computer-readable storage medium having a program causing a computer to implement a neural network system comprising a primary input layer configured to acquire primary data in both a learning mode and an operation mode, an auxiliary input layer configured to acquire auxiliary data solely in the learning mode, a first partial network configured to receive the primary data of the primary input layer and to receive the auxiliary data of the auxiliary input layer multiplied by non-permeability representing a coefficient used to adjust an influence on learning, and a second partial network configured to receive the output of the first partial network,
wherein the first partial network is configured to perform pretraining using both the primary data of the primary input layer and the auxiliary data of the auxiliary input layer; and
wherein after the pretraining, the first partial network is configured to perform percolative learning solely using the primary data of the primary input layer by adjusting the non-permeability so as to produce a same calculation result as a calculation result produced using both the primary data of the primary input layer and the auxiliary data of the auxiliary input layer.

* * * * *